US010144028B2

(12) United States Patent
Turnage et al.

(10) Patent No.: US 10,144,028 B2
(45) Date of Patent: Dec. 4, 2018

(54) AGRICULTURAL SPRAY CONTAINMENT DEVICES, SYSTEMS AND METHODS

(71) Applicant: COTTON TAIL INDUSTRIES, LLC, Bernie, MO (US)

(72) Inventors: Patrick L. Turnage, Hayti, MO (US); Tyler L. Perkins, Bernie, MO (US)

(73) Assignee: Cotton Tall Industries, LLC, Bernice, MO (US)

( * ) Notice: Subject to any disclaimer, the term of this patent is extended or adjusted under 35 U.S.C. 154(b) by 105 days.

(21) Appl. No.: 14/928,630

(22) Filed: Oct. 30, 2015

(65) Prior Publication Data

US 2016/0121354 A1 May 5, 2016

Related U.S. Application Data

(60) Provisional application No. 62/072,664, filed on Oct. 30, 2014.

(51) Int. Cl.
| | |
|---|---|
| *B05B 15/04* | (2006.01) |
| *B05B 13/00* | (2006.01) |
| *A01M 7/00* | (2006.01) |
| *B05B 12/22* | (2018.01) |

(52) U.S. Cl.
CPC ....... *B05B 15/0437* (2013.01); *A01M 7/0064* (2013.01); *B05B 12/22* (2018.02); *B05B 13/005* (2013.01)

(58) Field of Classification Search
CPC ....... B05B 15/065; B05B 1/20; B05B 13/005; A01M 7/0042; A01M 7/0064

USPC .................................................. 239/164, 499

See application file for complete search history.

(56) References Cited

U.S. PATENT DOCUMENTS

| | | | | |
|---|---|---|---|---|
| 1,669,435 A * | 5/1928 | Wheeler | A01M 7/0064 | 239/172 |
| 4,736,888 A * | 4/1988 | Fasnacht | A01M 7/005 | 239/161 |
| 4,947,581 A * | 8/1990 | Claussen | A01M 7/0064 | 239/175 |
| 5,156,338 A * | 10/1992 | Borland | A01M 7/0064 | 239/159 |
| 5,248,090 A * | 9/1993 | Williamson | A01M 7/0064 | 239/168 |
| 5,371,969 A * | 12/1994 | Claussen | A01M 7/0064 | 239/175 |
| 5,520,335 A | 5/1996 | Claussen et al. | | |

(Continued)

FOREIGN PATENT DOCUMENTS

| | | |
|---|---|---|
| CA | 2618532 A1 | 7/2008 |
| EP | 2 510 768 A1 | 10/2012 |

(Continued)

*Primary Examiner* — Chee-Chong Lee
(74) *Attorney, Agent, or Firm* — Maxwell J. Petersen; Lewis Brisbois Bisgaard & Smith LLP

(57) ABSTRACT

Devices, systems, and methods for containing the plume of a sprayed agricultural compound applied to a crop field are disclosed. In particular, the plume of the sprayed agricultural compound may be contained within a spray hood assembly attached to an agricultural vehicle or device such as a planter unit. Each spray hood assembly may be situated behind an individual planter unit, and multiple spray hood assemblies may be combined to form an agricultural spray containment system.

15 Claims, 17 Drawing Sheets

(56) References Cited

U.S. PATENT DOCUMENTS

Figure 1:
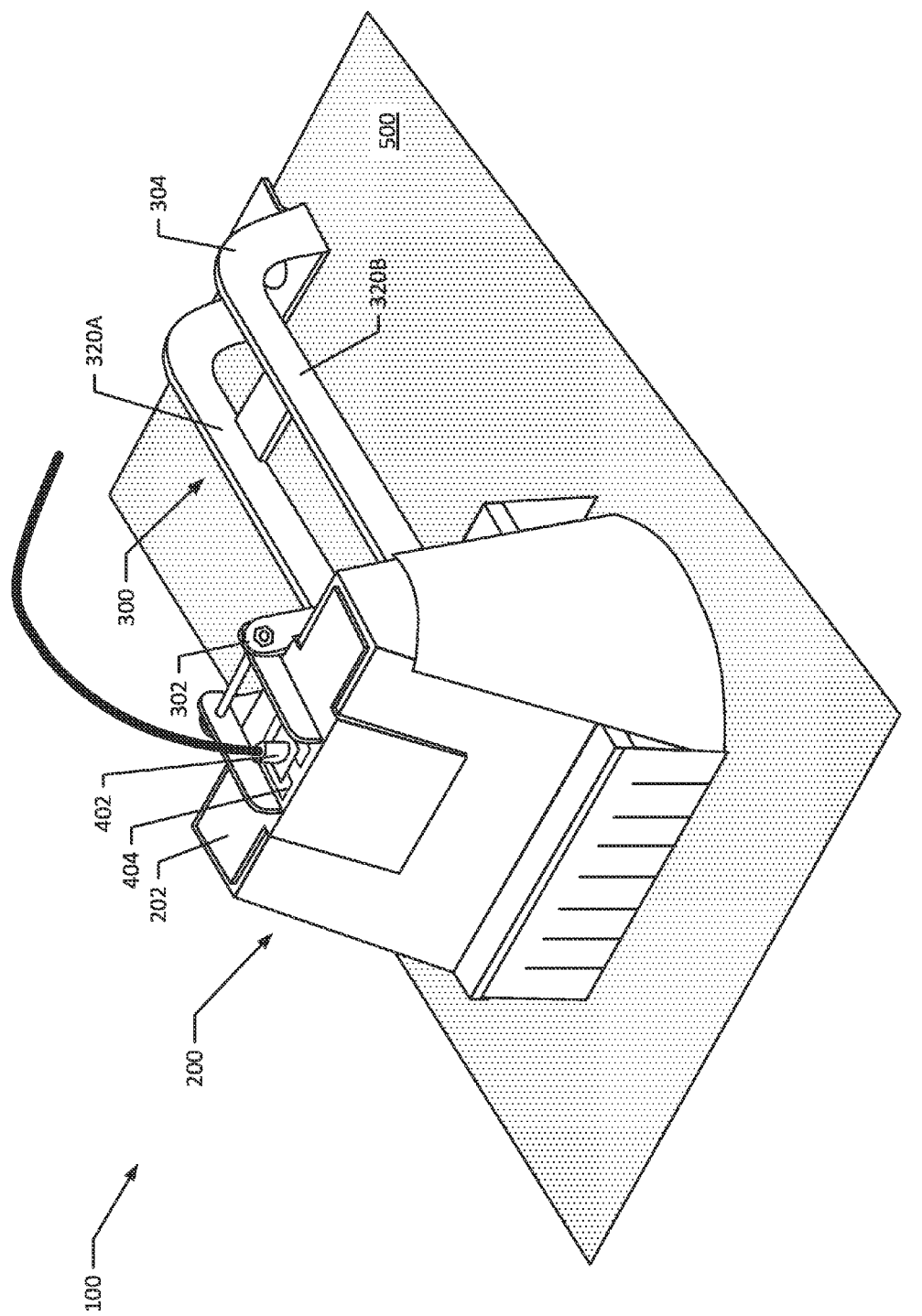

| | | | |
|---|---|---|---|
| D372,298 | S | 7/1996 | Claussen et al. |
| 6,334,578 | B1 | 1/2002 | House |
| 7,063,273 | B2 | 6/2006 | Hahn et al. |
| D669,996 | S | 10/2012 | Claussen |
| 8,573,510 | B2 | 11/2013 | Bisson et al. |
| 2008/0179429 | A1 | 7/2008 | Beilke et al. |
| 2012/0248218 | A1 | 10/2012 | Hoeben |
| 2013/0001320 | A1* | 1/2013 | Claussen ............ B05B 15/0437 239/150 |

FOREIGN PATENT DOCUMENTS

| | | |
|---|---|---|
| EP | 2 624 685 | 8/2013 |
| EP | 2 684 436 A1 | 1/2014 |
| WO | 2011046424 A1 | 4/2011 |
| WO | 2012005586 A2 | 1/2012 |
| WO | 2014031858 A1 | 2/2014 |

\* cited by examiner

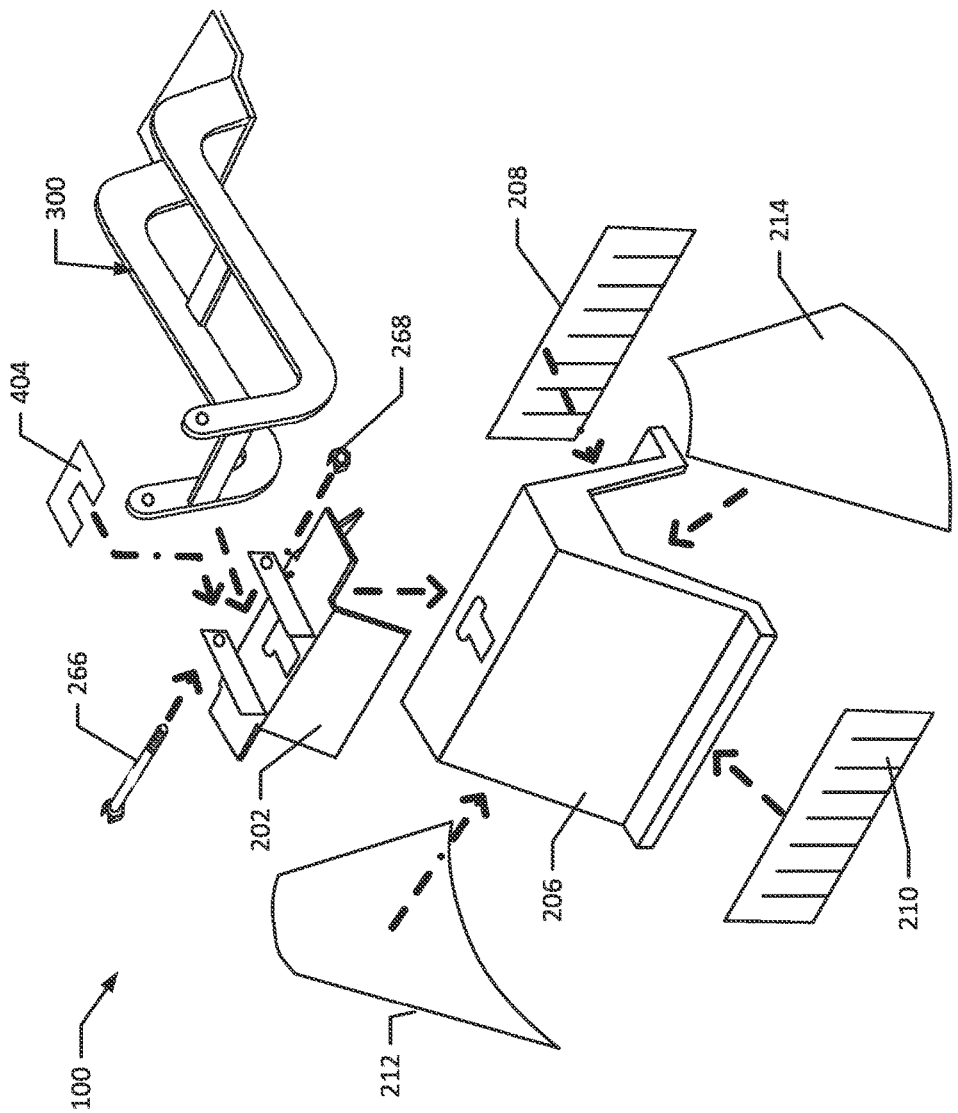

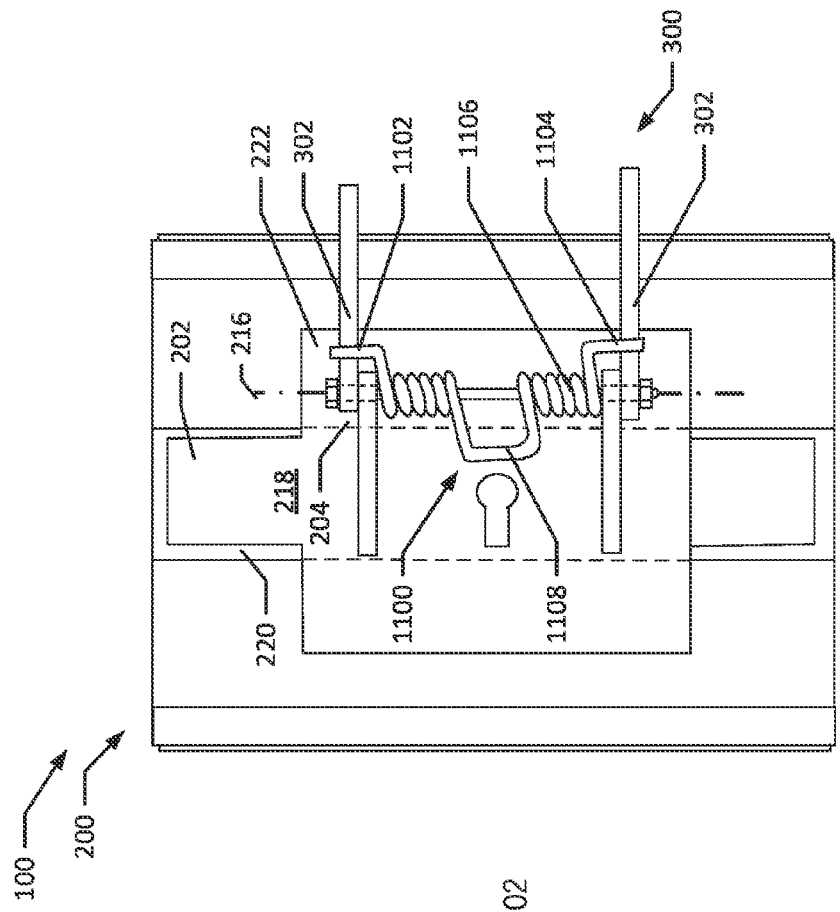
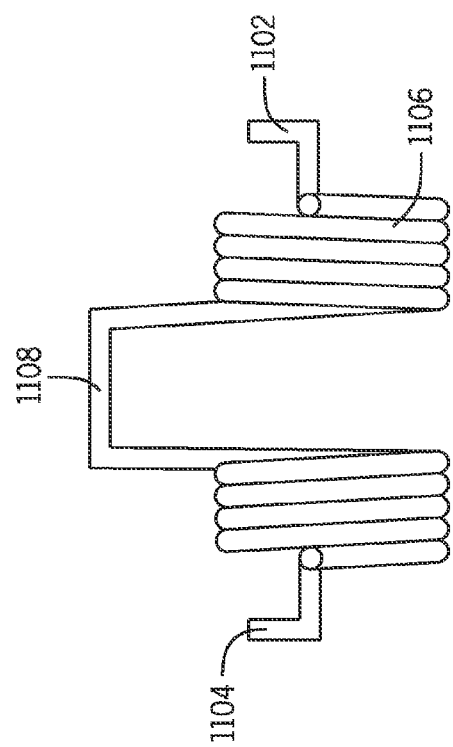
FIG. 11A
FIG. 11B

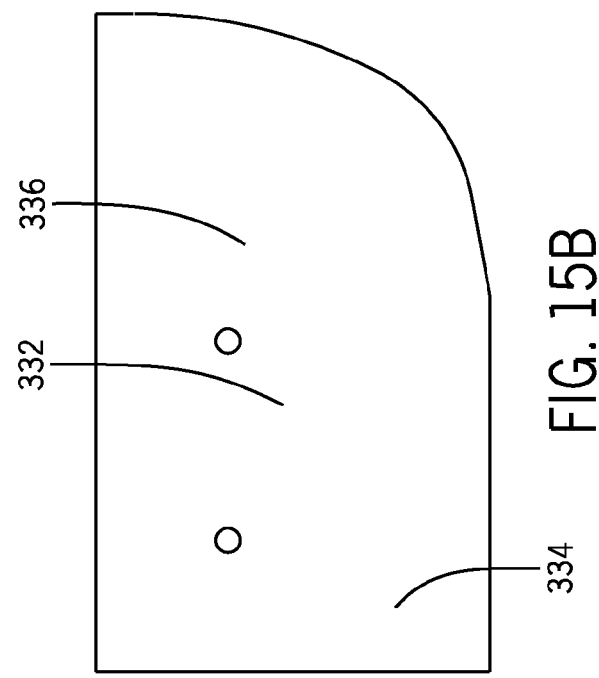
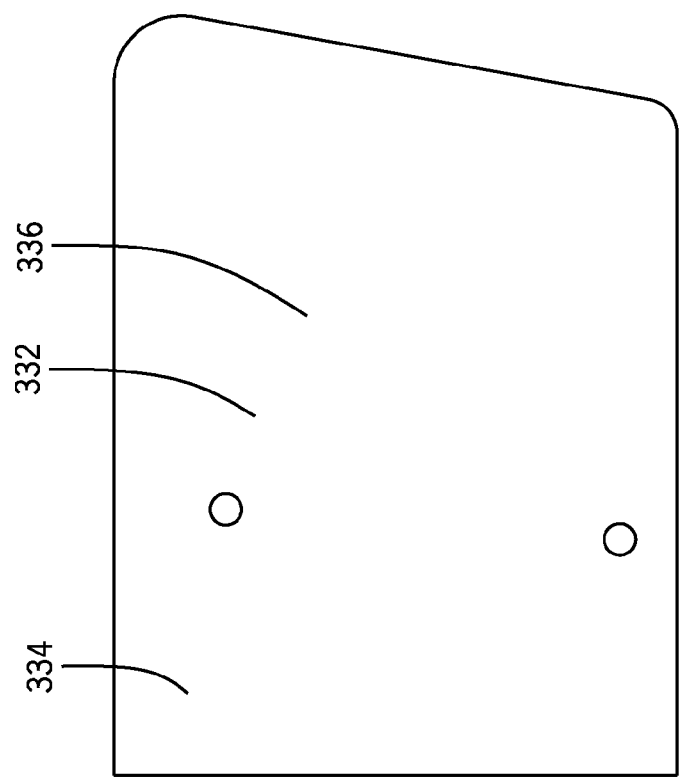

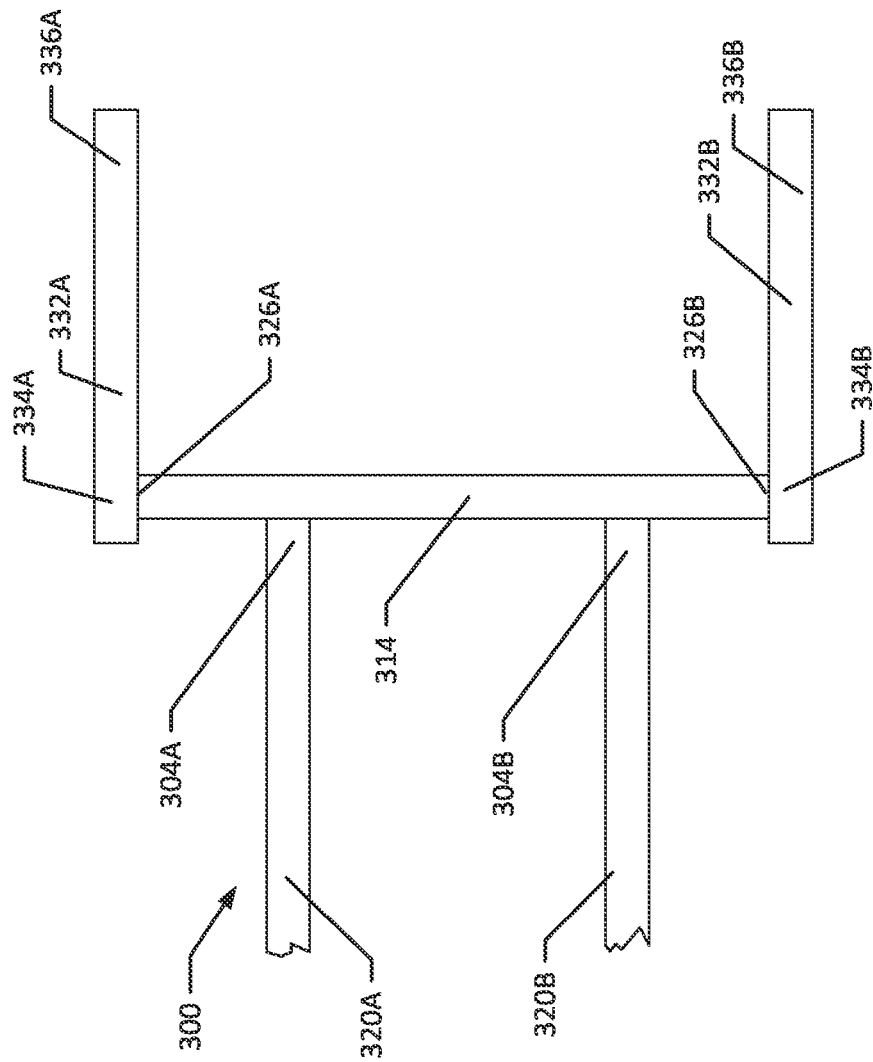

AGRICULTURAL SPRAY CONTAINMENT DEVICES, SYSTEMS AND METHODS

CROSS REFERENCE TO RELATED APPLICATION

This application claims the benefit of U.S. Provisional Patent Application 62/072,664 filed Oct. 30, 2014, which is hereby incorporated by reference.

FIELD OF THE INVENTION

The present disclosure relates to devices, systems, and methods for containing sprayed agricultural products. In particular, the present disclosure relates to an agricultural spray containment device for attachment to a vehicle.

BACKGROUND OF THE INVENTION

Modern agriculture relies upon the delivery of a variety compounds such as pesticides via hydraulic sprayer devices. The effectiveness of the sprayed products is influenced by a variety of factors including the timing of the application as well as the climatic conditions that exist during application of the sprayed compound. Pre-emergent pesticide products must be applied prior to the germination of the weeds, and therefore the timing of the spray application is critical. Application of the sprayed compound during rainy conditions may result in excessive runoff of the compound. Application of the sprayed compound during windy conditions may result in excessive drift in which the sprayed product is blown away from its intended target. These reductions in the effectiveness of the sprayed products are associated with increased costs to the farmer, as well as the introduction of the sprayed products into unwanted locations such as other crop fields or water sources.

Without specialized equipment, farmers are forced to time-spraying applications to coincide with relatively windless and dry climatic conditions. However, due to the variability of climatic conditions, in particular during typical planting seasons, the application of sprayed products may be delayed until the sprayed product may no longer be used effectively (i.e., weeds germinate before applying pre-emergent pesticide), or windy or rainy conditions may arise during application of the sprayed products, with the associated difficulties described above.

Existing specialized spray containment equipment for agricultural spray devices have incorporated spray hoods extending across an entire row of sprayers or an array of smaller spray hoods integrated into a single structure, but such large structures are relatively onerous to transport, operate, and maintain. Typically, these large spray containment structures are too large to be used in combined planting/spraying operations. As a result, the use of these large spray containment structures typically require spraying to be performed as a separate operation from planting, thereby impacting the timing of the application of the sprayed product. In addition, the existing spray containment equipment is typically large and awkward to transport to the fields and operate, thereby prolonging the time needed for a spray application and potentially sacrificing effectiveness in the face of uneven terrain. One existing spray containment structure includes an array of individual spray hoods, but the individual spray hoods are fixedly attached to a support boom, effectively integrating the array into a single enlarged structure with the attendant problems as discussed above.

A need exists for an agricultural spray containment system capable of operating in uneven terrain. A need further exists for an agricultural spray containment system capable of operating coincidentally with other agricultural processes such as field preparation and/or planting. Such a system would enable enhanced flexibility for the application of sprayed agricultural products and reduce the amount of time and fuel expended performing spray applications, as well as reduce waste due to drift as part of an agricultural operation.

BRIEF SUMMARY OF THE INVENTION

In one aspect, an agricultural spray containment device for attachment to a vehicle is provided that may include a spray hood assembly and a support arm. The spray hood assembly may include a spray hood and a top plate. The top plate may include a hinged attachment fitting and a spray head attachment fitting. The support arm may include a forward end operatively coupled to the vehicle and a rear end operatively coupled to the top plate at the hinged attachment fitting. The top plate may provide a structural attachment point for the spray hood attached to a lower surface of the top plate. The hinged attachment fitting may permit upward rotation of the top plate and attached spray hood to provide clearance over an obstacle. The hinged attachment fitting may further include a biasing spring to provide a restoring torque and to return the top plate to a horizontal position after an upward rotation. The spray hood may include an open-ended shell covering a region of a field corresponding to an area wetted by a spray head directed into the spray hood via the spray head attachment fitting. The spray hood may further include: a front face; a rear face; a pair of lateral faces; and a top face joined to the front face, rear face, and the pair of lateral faces to form a front top edge, a rear top edge, and a pair of lateral top edges, respectively. Each lateral face may include a lateral opening. Each lateral face may be joined to the front face to form one front lateral edge and joined to the rear face to form one rear lateral edge. An upper surface of the top face may be attached to the lower surface of the top plate. The spray hood assembly may further include: a front curtain that includes a first flexible rectangular sheet with a front curtain edge attached to a lower front edge of the front face and hanging downward; a rear curtain that may include a second flexible rectangular sheet with a rear curtain edge attached to a lower rear edge of the rear face and hanging downward; and a pair of lateral curtains. Each lateral curtain may include a flexible trapezoidal sheet including a front lateral curtain edge affixed to the front face along one front lateral edge and a rear lateral curtain edge affixed to the rear face along one rear lateral edge. Each attached lateral curtain may form a conical profile curving laterally outward from each lateral face. The front curtain may further include a lower front curtain edge opposite to the front curtain edge and hanging to a distance of at least 2 inches above the field. The rear curtain may further include a lower rear curtain edge opposite to the rear curtain edge and hanging to a distance of at least 1 inch above the field. Each lateral curtain may further include a lower lateral curtain edge forming a lower edge of the curved partial cone at a distance of at least 1 inch above the field. The spray hood assembly may be situated behind a planter unit attached to the vehicle. The top plate may further include: a central portion including the lower surface covering at least a portion of the top face of the spray hood; and a forward tongue projecting forward and downward from a forward edge of the central portion. The hinged attachment fitting may be attached to an upper surface of the central portion opposite to the lower surface. The central portion may define the spray head attachment fitting extending through the upper surface and the lower surface. A forward contact surface of the forward tongue may contact at least a portion of the forward face of the spray hood. The downward rotation of the top plate and attached spray hood may be limited by a mechanical interference between the forward tongue and at least a portion of the support arm. The top plate may further include a rear tongue projecting rearward and downward from a rear edge of the central portion. A rear contact surface of the rear tongue may contact at least a portion of the rear face of the spray hood.

In another aspect, an agricultural spray containment system for attachment to a vehicle is provided that may include at least two spray containment devices. Each spray containment device may include: a spray hood assembly that includes a spray hood and a top plate; and a support arm assembly that may include a forward end operatively coupled to the vehicle and a rear end operatively coupled to the top plate at the hinged attachment fitting. The top plate may include a hinged attachment fitting and a spray head attachment fitting. The top plate may provide a structural attachment point for the spray hood attached to a lower surface of the top plate. The hinged attachment fitting may permit upward rotation of the top plate and attached spray hood to provide clearance over an obstacle. Each of the at least two spray containment devices may rotate upward independently of any of the other spray containment devices. The hinged attachment fitting of each of the at least two spray containment devices may further include a biasing spring to provide a restoring torque and return the top plate to a horizontal position after an upward rotation. The spray hood of each of the at least two spray containment devices may include an open-ended shell covering a region of a field corresponding to an area wetted by a spray head directed into the spray hood via the spray head attachment fitting. The spray hood assembly of each of the at least two spray containment devices may be situated behind one planter unit attached to the vehicle. The region of the field covered by the spray hood of each of the at least two spray containment devices may include at least one row planted by the planter unit situated forward of each spray containment device. The hinged attachment fitting of each of the at least two spray containment devices may permit upward rotation of the top plate sufficient to invert the spray hood to facilitate maintenance of the spray containment device.

While multiple embodiments are disclosed, still other embodiments of the present disclosure will become apparent to those skilled in the art from the following detailed description, which shows and describes illustrative embodiments of the disclosure. As will be realized, the invention is capable of modifications in various aspects, all without departing from the spirit and scope of the present disclosure. Accordingly, the drawings and detailed description are to be regarded as illustrative in nature and not restrictive.

BRIEF DESCRIPTION OF THE DRAWINGS

The following figures illustrate various aspects of the disclosure.

FIG. 1 is an isometric view of an agricultural spray containment device.

FIG. 2 is an isometric view of a spray hood assembly.

FIG. 3 is an isometric view of a spray hood of a spray hood assembly.

FIG. 4 is a planform view of a top plate of a spray hood assembly.

FIG. 5 is a top view of an agricultural spray containment device.

FIG. 6 is a side view of an agricultural spray containment device with the spray hood assembly in an operating position.

FIG. 7 is a side view of an agricultural spray containment device with the spray hood assembly rotated upward to provide clearance for an obstacle.

FIG. 8 is a side view of an agricultural spray containment device with the spray hood assembly rotated upward to an inverted position to facilitate maintenance of the spray hood assembly.

FIG. 9 is an isometric view of an agricultural spray containment system that includes a plurality of agricultural spray containment devices with each device situated behind one individual planter unit.

FIG. 10 is an exploded isometric view of an agricultural spray containment device.

FIG. 11A is a top view of a biasing spring of a spray hood assembly.

FIG. 11B is a top view of a spray hood assembly with a biasing spring.

FIG. 12 is a side view of a hinge plate of a spray hood assembly.

FIG. 13A is a side view of a support arm of a support arm assembly in one aspect.

FIG. 13B is a side view of a support arm of a support arm assembly in another aspect.

FIG. 14A is a top view of an attachment plate of a support arm assembly in one aspect.

FIG. 14B is a front view of an attachment plate of a support arm assembly in another aspect.

FIG. 14C is a front view of an attachment plate of a support arm assembly in an additional aspect.

FIG. 15A is a side view of a side plate of a support arm assembly in one aspect.

FIG. 15B is a side view of a side plate of a support arm assembly in another aspect.

FIG. 16 is a planform view of a lateral curtain of a spray hood assembly.

FIG. 17 is a top view of a support arm assembly with a pair of side plates attached to an attachment plate.

Corresponding reference characters and labels indicate corresponding elements among the views of the drawings. The headings used in the figures should not be interpreted to limit the scope of the claims.

DETAILED DESCRIPTION

In various aspects, devices, systems and methods for applying an agricultural spray using an agricultural spray containment device attached to a vehicle are disclosed herein. The agricultural spray containment device may reduce losses of the applied spray due to drift without substantially interfering with a coverage pattern of a spray nozzle used to apply the agricultural spray. In addition, each spray containment device is dimensioned to contain the spray from a single nozzle corresponding to a coverage of one or more rows of a crop planted by a single planter unit, thereby enabling a modular design. Using this modular design, each spray containment device may be combined with one or more additional spray containment devices to form an agricultural spray containment system to perform spray applications over two or more rows of a crop.

The modular design of the spray containment device further enables flexibility of the device with respect to integration with a variety of existing spray systems, planting systems, soil preparation systems, farming vehicles, and hitching systems. By way of non-limiting example, each spray containment device may be situated behind a planter unit attached to the vehicle. In this example, if the planting system includes multiple planter units, a spray containment device may be situated behind each individual planter unit of the system. The spray containment device may be situated behind any known planter unit including, but not limited to: a single row planter unit, a twin row planter unit, and any other planter unit known in the art. This arrangement of a spray containment system in which a spray containment device is situated behind each planter unit enables the farmer to plant a crop and immediately apply an agricultural spray product including, but not limited to, a pre-emergent pesticide and/or a sprayed fertilizer, in a single trip.

In an aspect, each spray containment device may include a spray hood mounted at a hinged attachment fitting to allow the spray hood to rotate within a limited range. This hinged attachment fitting enables the spray hood to rotate upward and provide clearance over an obstacle including, but not limited to, a dirt clod or other topographical irregularity in a crop field. Because each spray hood is attached to the vehicle independently via a dedicated hinged attachment fitting, each spray hood may independently rotate without perturbing other spray hoods in the system. In another aspect, each spray hood may be rotated independently upward to an inverted position to facilitate maintenance of the spray containment device and associated spray head.

In various aspects, the agricultural spray containment device and spray containment system overcome many of the limitations of previous spray containment systems. The modular design enables considerable flexibility in the integration of the spray containment device with existing agricultural vehicles, devices, and systems. In particular, the spray containment system may be situated behind a planting system, enabling planting and spraying to be accomplished in a single run, saving both time and fuel. Further, the combined planting/spraying may reduce the risk of loss due to random events such as rain that may delay a spray application performed separately after completion of planting, as must be done in previous spray containment systems.

In addition, the modular design permits the repair or replacement of individual spray containment devices within a system, thereby facilitating maintenance or trouble-shooting of the spray containment system. The independent rotation of each spray containment device in the system further enhances access to each individual spray hood, permitting the maintenance of the spray containment system while still attached to the planting system and/or vehicle.

Detailed descriptions of the spray containment device and spray containment systems in various aspects are provided herein below.

I. Spray Containment Device

In one aspect, the spray containment device 100 is illustrated in FIG. 1. In this aspect, the spray containment device 100 may include a spray hood assembly 200 and a support arm assembly 300. The spray hood assembly 200 may form a barrier around a spray plume (not shown) produced by a spray head 402 operatively coupled to the spray hood assembly 200 to reduce the loss of an agricultural spray (not shown) applied by the spray head 402 to the field 500. The support arm assembly 300 is operatively coupled to the spray hood assembly 200 at a rear end 302 and is further operatively coupled to the vehicle, or to a towed agricultural device including, but not limited to, a planter unit (not shown) at a forward end 304 opposite to the rear end 302.

The spray containment device 100 is configured to contain the spray plume without significantly altering the spray pattern contacting the field 500 from the spray pattern produced by the spray head 402 in the absence of the spray containment device 100. In one aspect, the spray head 402 and associated spray containment device 100 may be dimensioned to cover at least one planted row of a crop in the field 500 and may further overlap with an adjacent spray plume associated with one or more adjacent planted rows of a crop in the field 500. In other aspects, the spray head 402 and associated spray containment device 100 may be dimensioned to cover two or more adjacent planted rows of a crop in the field 500.

a. Spray Hood Assembly

Figure 2:
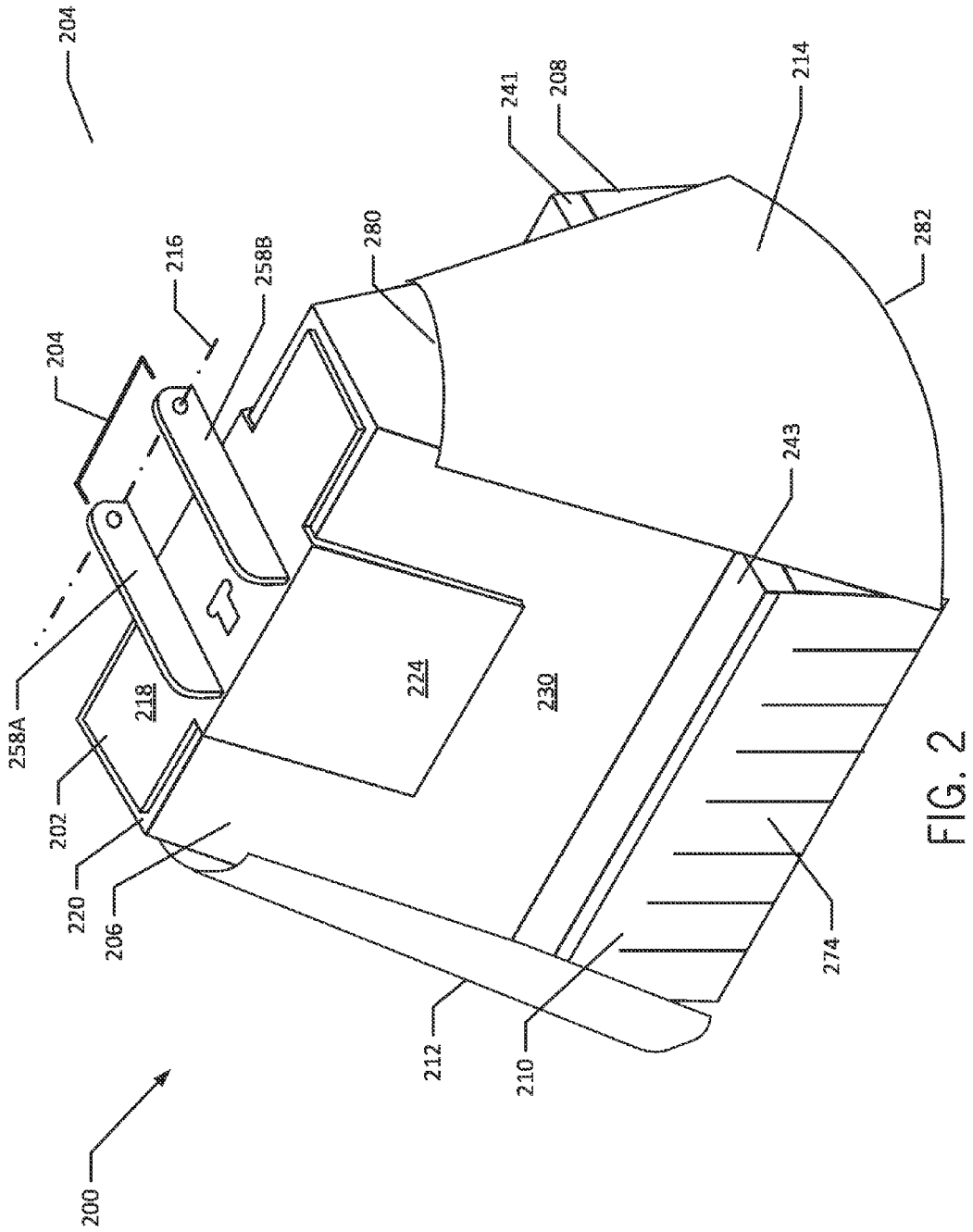

Referring again to FIG. 1, the spray hood assembly 200 may cover a region of the field 500 wetted by a spray application of an agricultural compound to prevent the loss of the sprayed compound due to drift. FIG. 2 is a close-up isometric view of the spray hood assembly 200 in an aspect. In various aspects, the spray hood assembly 200 may include a top plate 202, a spray hood 206 attached to the top plate 202, a front curtain 208 and a rear curtain 210 attached to the spray hood 206, and a pair of lateral curtains 212/214 also attached to the spray hood 206.

In one aspect, each spray hood assembly 200 is configured to contain the spray plume produced by a single spray head (not shown) over one or more rows of a planted crop. Each spray hood assembly 200 is attached to the vehicle independently and operates independently, enabling the incorporation of multiple spray hood assemblies 200 in a modular manner into a variety of agricultural operations involving a variety of different devices and equipment. By way of non-limiting example, a spray hood assembly 200 may be attached behind each planter unit in an 8-row assembly, a 12-row assembly, or any other number of rows in an assembly. In various additional aspects, each spray hood assembly 200 may be repaired and/or replaced independently, thereby facilitating the maintenance of a group of spray hood assemblies 200 used in an agricultural operation.

Spray Hood

Figure 3:
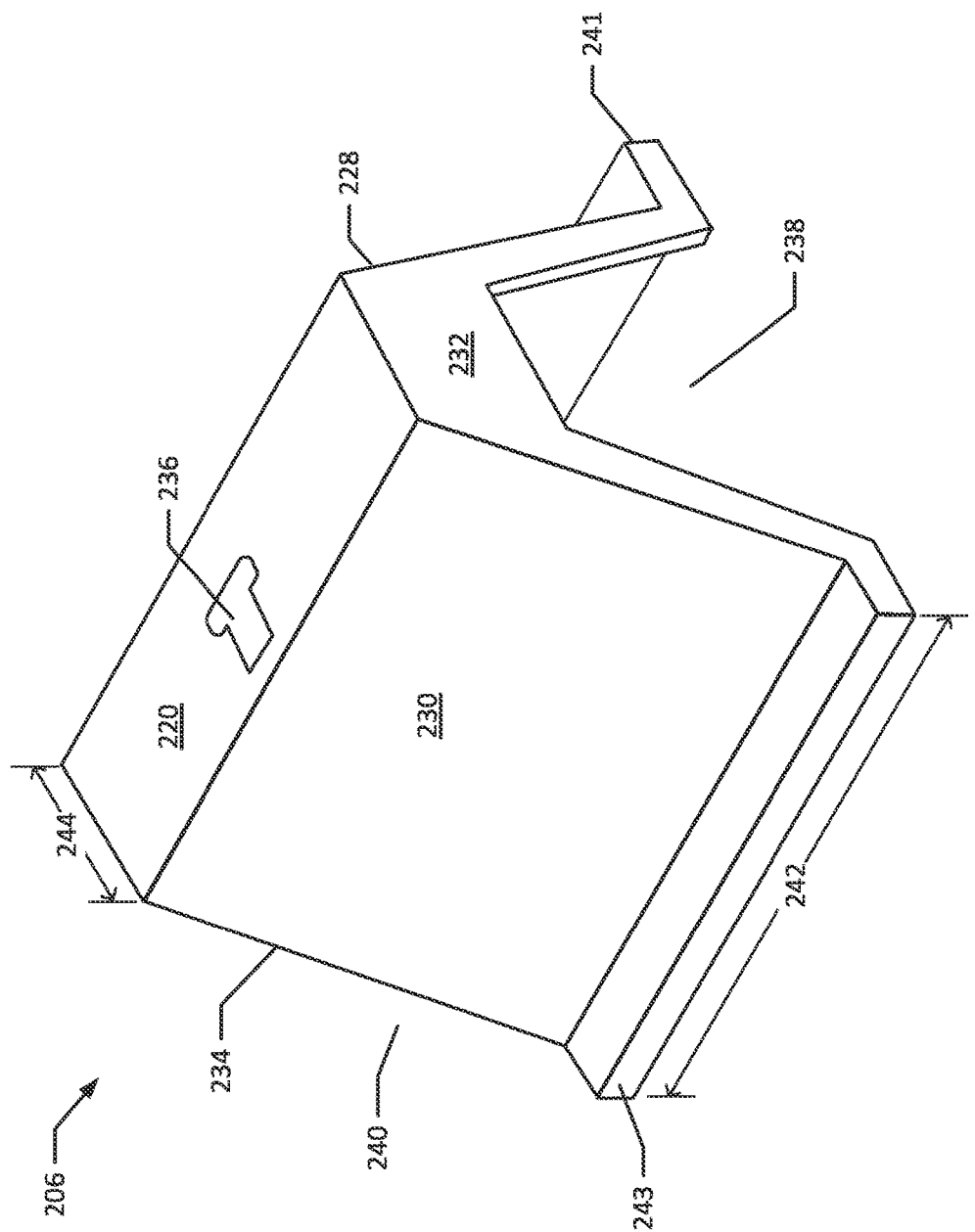

Referring again to FIG. 1 and to FIG. 10, the spray hood assembly 200 may include a spray hood 206 in various aspects. As illustrated in FIG. 3, the spray hood 206 may include an upper face 220, a forward face 228 (not shown), a rear face 230, and a pair of lateral faces 232 and 234. The forward face 228 may further include a spray head attachment fitting 236 through which the spray head 402 (not illustrated) may be inserted to enable the spray plume to be directed into the interior volume beneath the spray hood 206 and downward to the field (not shown) below. The spray hood 206 may enclose the spray plume within an interior volume enclosed by the upper face 220, forward face 228, rear face 230, and the pair of lateral faces 232 and 234.

In various aspects, the spray hood 206 may be constructed of any suitably lightweight and stiff material known in the art including, but not limited to, a lightweight plastic material such as polypropylene. In an aspect, the upper face 220, forward face 228, rear face 230 (not shown), and lateral faces 232/234 may be formed from relatively thin sheets of material. In various other aspects, the spray hood 206 may include local thickening, formed ribs, bracing, and/or any other known structural reinforcement within one or more regions including, but not limited to, an adjoining edge between two faces of the spray hood 206, along a free edge of any of the faces not joined to another face of the spray hood 206, an interior region of a relatively large face including, but not limited to, the forward face 228 and/or rear face 230.

By way of non-limiting example, the forward face 228 and rear face 230 of the spray hood 206 may include a thickened forward lower edge 241 and a thickened rear lower edge 243, respectively. In addition to structural reinforcement, the forward lower edge 242 and rear lower edge 244 may further provide attachment edges for the front curtain 208 and rear curtain 210, respectively, as described herein.

In another aspect, each of the lateral faces 232/234 may contain lateral openings 238/240, respectively, that enable the lateral spread of the spray plume beyond the limits of the lateral faces 232/234. The spray plume is ultimately contained by the pair of lateral curtains 212/214 (not illustrated) fastened over the lateral faces 232/234 as described herein.

Any suitable spray hood 206 may be incorporated into the spray hood assembly 200 without limitation. In one aspect, the spray hood 206 may be fabricated for use in the spray hood assembly 200. In another aspect, the spray hood 206 may be a commercially available spray hood element that may be adapted for use as the spray hood 206 within the spray hood assembly 200. In this aspect, the commercially available part may be used as purchased, or the commercially available part may be subjected to one or more modifications including, but not limited to, forming fastener holes, forming a spray head attachment fitting, forming a pair of lateral openings, adding structural reinforcements, and any other necessary modification known in the art.

In one aspect, the spray hood 206 may be a hood segment as described in U.S. Pat. No. 5,520,335 which is hereby incorporated by reference in its entirety. In another aspect, the spray hood 206 may be a hood segment as described in U.S. Pat. No. 6,334,578 which is hereby incorporated by reference in its entirety. In these aspects, the hood segments may be modified as described herein previously.

Top Plate

Referring again to FIG. 1 and to FIG. 10, spray hood assembly 200 may include the top plate 202 attached to the spray hood 206. In an aspect, the top plate 202 may provide robust structural support for the attachment of the spray hood assembly 200 to the support arm assembly 300. In addition, the hinged attachment fitting 204 may provide a hinged coupling of the spray hood assembly 200 to the support arm assembly 300 that enables the rotation of the spray hood assembly 200.

Figure 4:
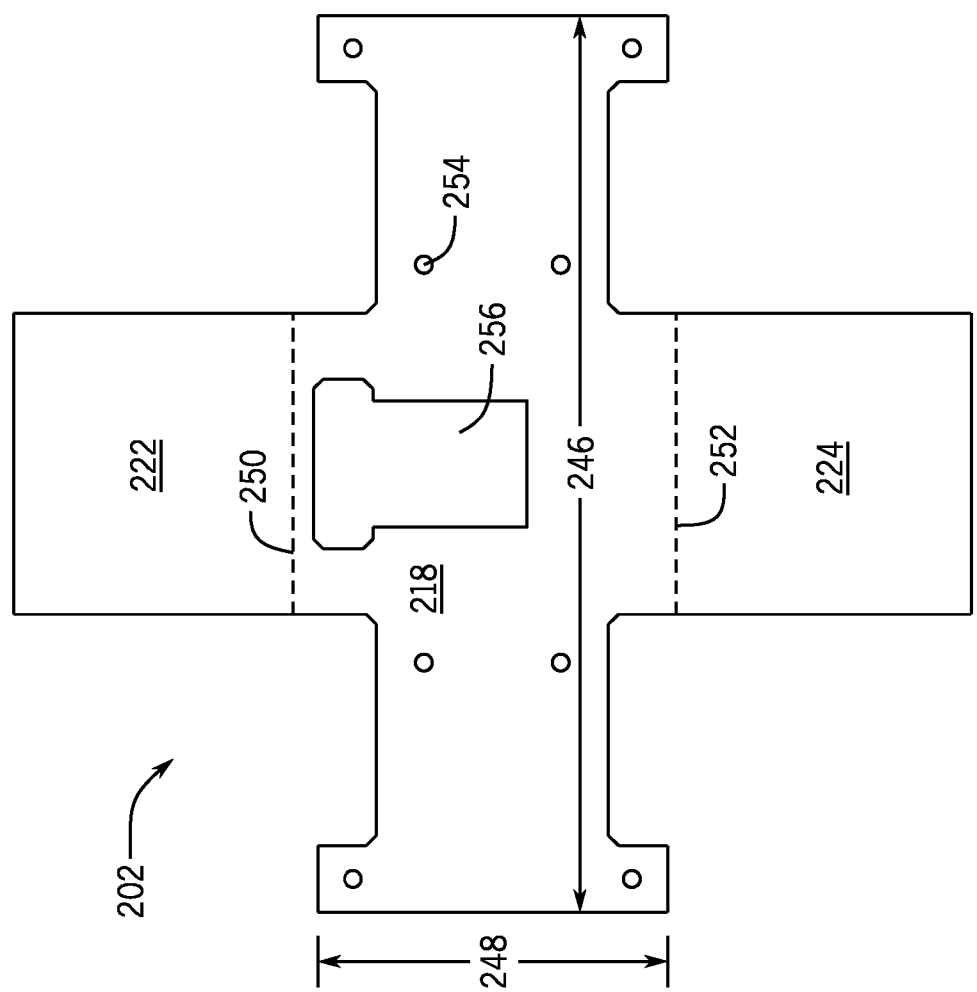

FIG. 4 is a plan view of the top plate 202 in one aspect. The top plate 202 may include a central portion 218, a forward tongue 222, and a rear tongue 224. The central portion 218 may attach to the upper face 220 of the spray hood 206, as illustrated in FIG. 2. In one aspect, the central portion 218 of the top plate 202 may essentially cover the upper face 220 of the spray hood 206. In another aspect, the central portion 218 may be smaller than the upper face 220. Referring to FIG. 3 and FIG. 4, the width 242 of the spray hood 206 may be matched to the width 246 of the central portion 218, and the length 248 of the central portion 220 of the spray hood 206 may be matched to the length 244 of the upper face 220 of the spray hood 206 in various aspects.

The top plate 202 may be attached to the upper face 220 using any attachment means known in the art without limitation. Non-limiting examples of suitable attachment means include: adhesives, welding, and fasteners such as screws, bolts, pins, rivets, and the like. Referring again to FIG. 4, in an aspect the top plate 202 may include one or more bores 254 formed through the top plate 202 to the underlying upper face 220 of the spray hood 206.

The top plate 202 may be formed from a sheet of a suitably strong material including, but not limited to, a metal such as steel or aluminum, a polymer, a composite material such as a graphite composite, and any other known high strength material. In one aspect, the top plate 202 may be formed from a steel plate including, but not limited to, a ⅜" hot rolled steel plate.

Forward and Rear Tongues

Figure 5:
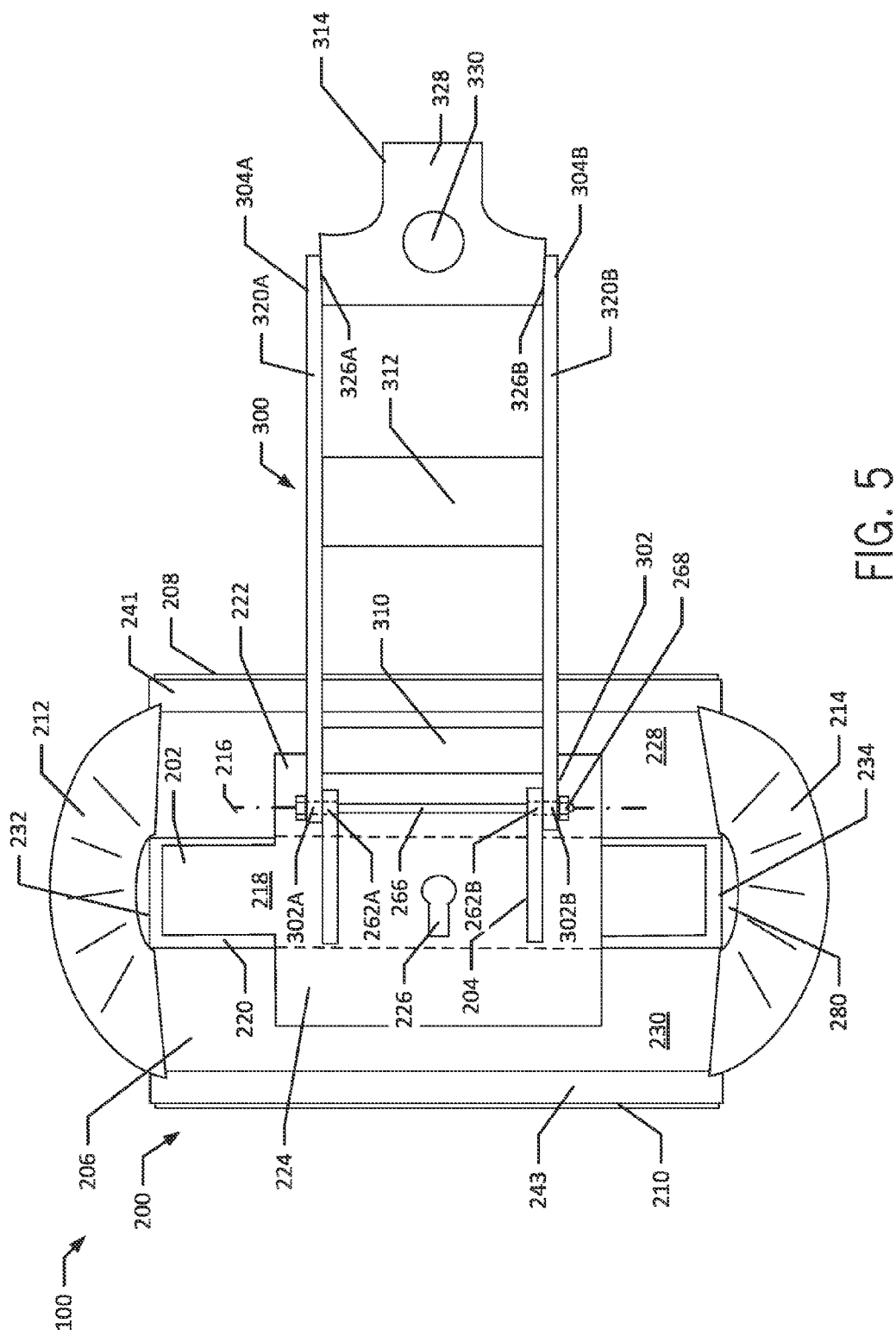

Referring again to FIG. 4, the forward tongue 222 may bend downward at a forward bend line 250 to extend forward and downward over the forward face 228 of the spray hood 206, as illustrated in FIG. 5, a top view of the spray containment device 100. Similarly, the rear tongue 224 may bend downward at a rear bend line 252 (see FIG. 4) to extend rearward and downward over the rear face 230 of the spray hood 206 as illustrated in FIG. 5. In an aspect, the rear tongue 224 may be aligned along the rear face 230 of the spray hood 206, as illustrated in FIG. 2, and the forward tongue 222 may be aligned along the forward face 228 of the spray hood 206.

Spray Head Attachment Fitting

Referring again to FIG. 4, the central portion 218 of the top plate 202 may define a spray head attachment fitting 256 to which the spray head 402 is operatively coupled. In an aspect, the spray head attachment fitting 256 of the top plate 202 may be situated in vertical alignment with the spray head attachment fitting 236 of the spray hood 206. The spray head 402 may be situated within the opening formed by the spray head attachment fittings 236/256 and held in place by a spray head fixation plate 404 that may be reversibly attached to the top plate 202 as illustrated in FIG. 1 and in FIG. 10.

Hinged Attachment Fitting

Figure 12:
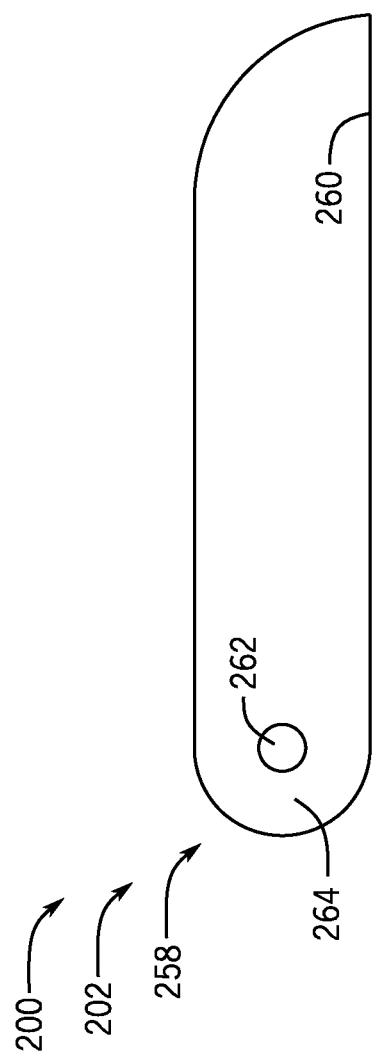

Referring again to FIG. 2, a hinged attachment fitting 204 may be attached to the top plate 202 in various aspects. In various aspects, the hinged attachment fitting 204 may be any known hinged fitting known in the art without limitation. As illustrated in FIG. 2, the hinged attachment fitting 204 may include a pair of hinge plates 258A/258B projecting perpendicularly upward from the top plate 202 in an aspect. FIG. 12 is a side view of a hinge plate 258 in one aspect showing a bottom edge 260 which is attached to the top plate 202 (not shown) as well as a hinge pin bore 262 formed near a forward end 264 of the hinge plate 258. The hinge plate 258 may attach to the top plate 202 (not shown) at the bottom edge 260 by any known fastening means including, but not limited to, welding and/or an adhesive in various aspects. In various other aspects, the hinged attachment fitting 204 may be an integral structure with the top plate 202. By way of non-limiting example, the top plate 202 and hinged attachment fitting 204 may be cast as a single structure in an aspect.

Referring again to FIG. 5, each hinge pin receptacle 262A/262B may be aligned to receive a hinge pin 266 inserted through the hinge pin receptacles 262A/262B along a hinge axis 216. The hinge pin receptacles 262A/262B may further align with corresponding hinge pin receptacles 316A/316B, respectively, formed within the rear end 302 of the support arm assembly 300. The hinge pin 266 may extend through the hinge pin receptacles 316A/316B and may be retained in this position using any known retention means including, but not limited to, pins or nuts. In one aspect, the hinge pin 266 may be retained by a nut 268 advanced over a threaded end of the hinge pin 266, as illustrated in FIG. 5.

Figure 6:
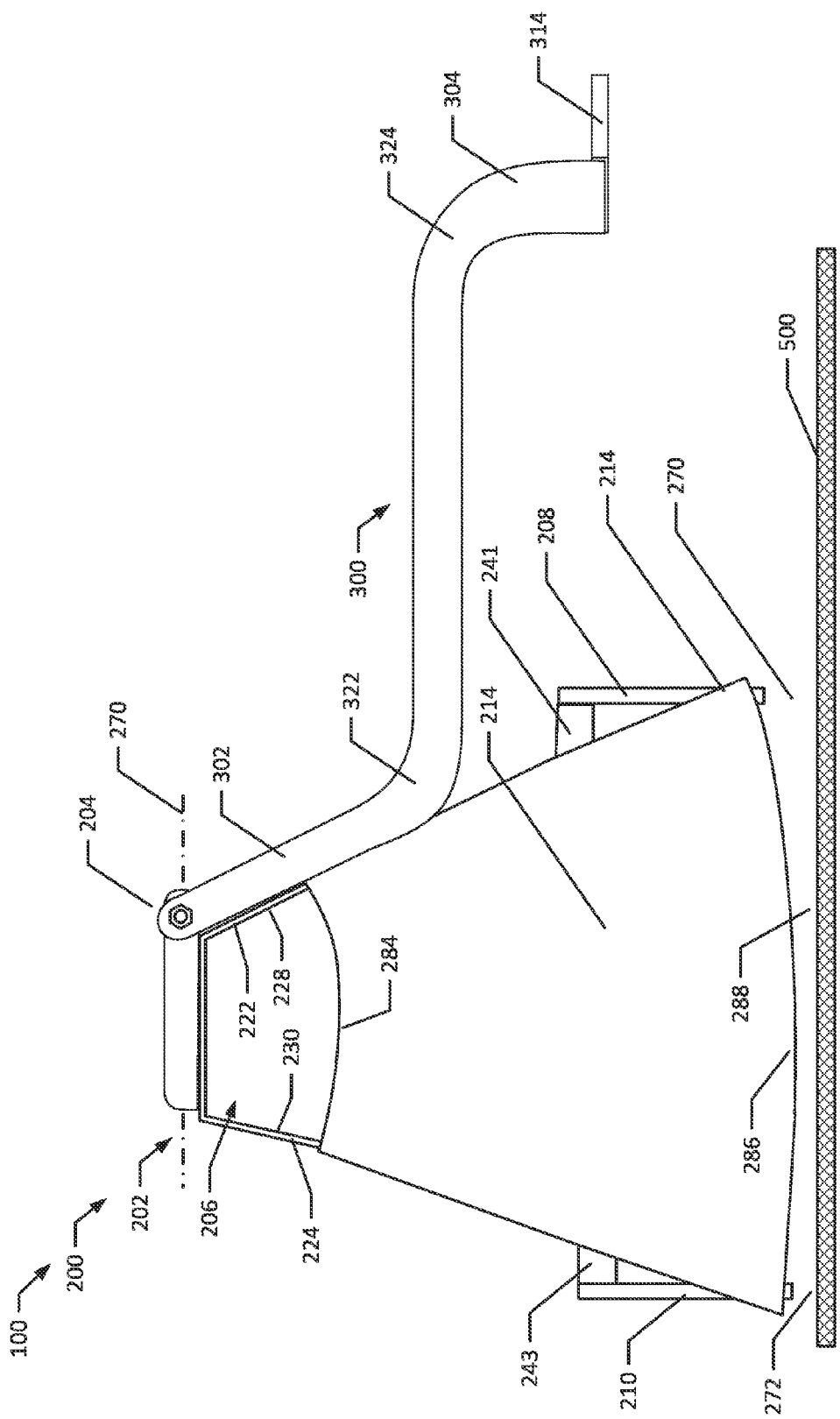
Figure 7:
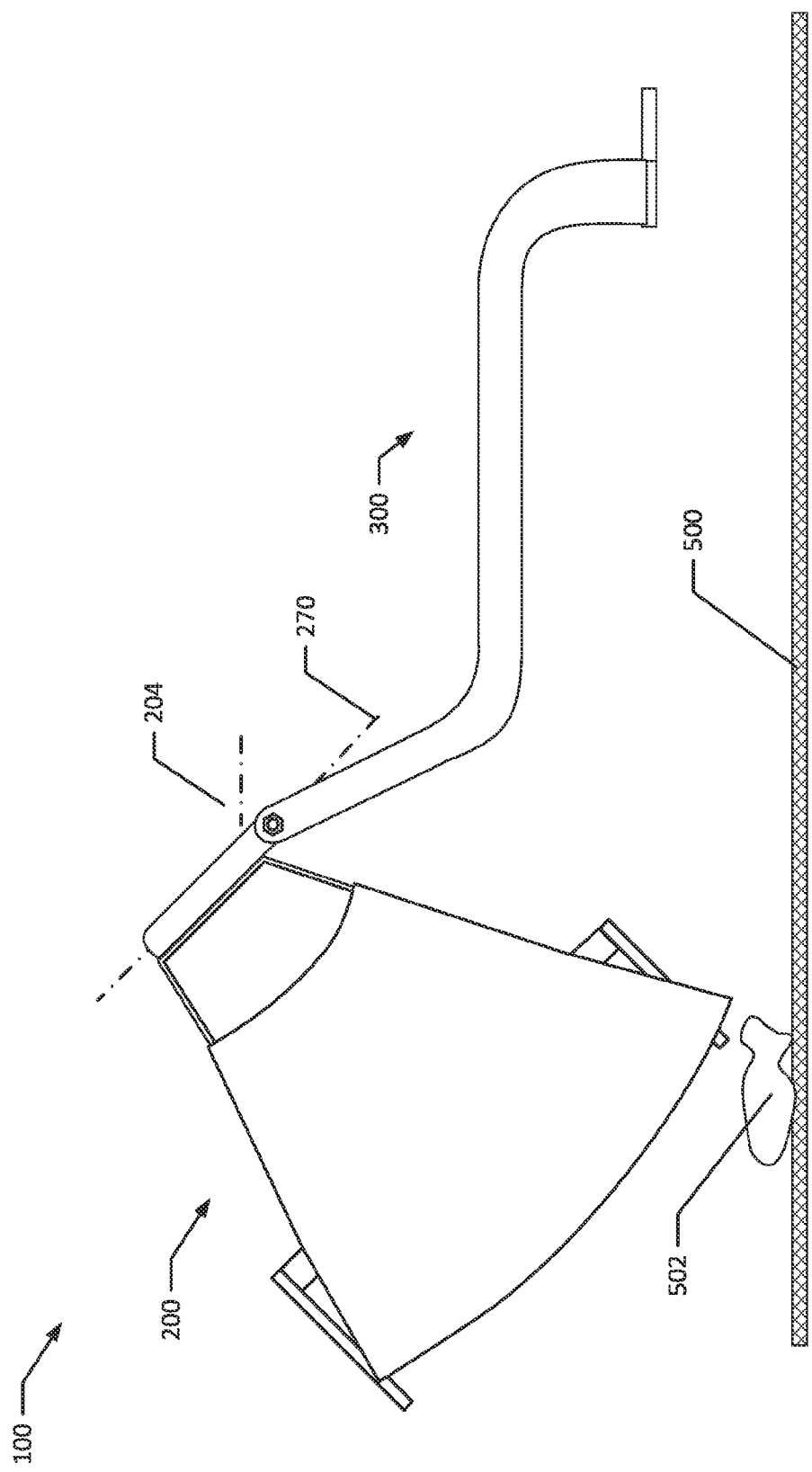
Figure 8:
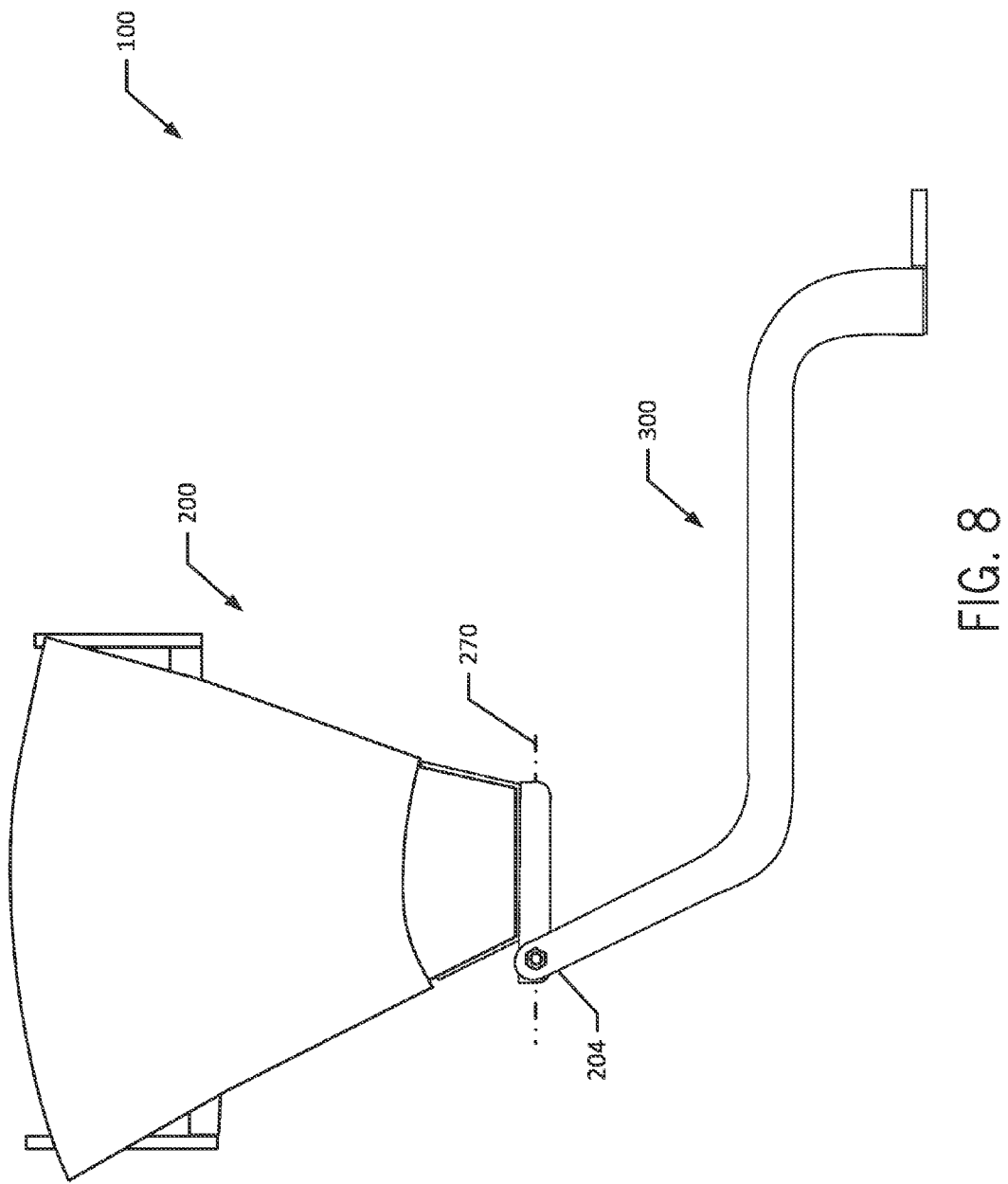

In various aspects, the hinged attachment fitting 204 may enable limited rotation of the spray hood assembly 200 about the hinge axis 216 within an angular range constrained by one or more means as described in detail herein below. FIG. 6 is a side view of spray containment device 100 illustrating the spray hood assembly 200 with the top plate axis 270 rotated relative to horizontal; this rotation may enable the spray hood assembly 200 to clear an obstacle 502 including, but not limited to, a rock, dirt clod and/or other irregularity on the surface of the field 500. FIG. 7 is a side view of spray containment device 100 illustrating the spray hood assembly 200 in an operating position characterized by a horizontal alignment of the top plate axis 270. FIG. 8 is a side view of spray containment device 100 illustrating the spray hood assembly 200 in an inverted position; the inverted position may be used to facilitate the maintenance and/or repair of the spray hood assembly 200 in various aspects.

Constraints on Spray Hood Assembly Rotation

The rotation of the spray hood assembly 200 about the hinge axis 216 may be constrained to within a predetermined range using any known means of limiting rotation of a hinge joint known in the art without limitation. In one aspect, the rotation of the spray hood assembly 200 may be limited by a mechanical interference of two or more structural elements of the spray containment device 100. Referring again to FIG. 6, the rotation of the spray hood assembly 200 in a forward direction may be limited by a mechanical interference between the rear end 302 of the support arm assembly 300 and the forward tongue 222 of the top plate 202. In other aspects, the rotation of the spray hood assembly 200 about the hinge axis 216 may be constrained using other means including, but not limited to springs, dampers, rotational actuators, mechanical stops, and any other known means of limiting rotation about a hinge.

In various aspects, any known biasing spring may be used to constrain the rotation of the spray hood assembly 200. FIG. 11A is a top view of a biasing spring 1100 used to constrain the rotation of the spray hood assembly 200 about the hinge axis 216 in one aspect. The biasing spring 1100 may include a first end 1102 and a second end 1104 projecting from opposite ends of a wound spring portion 1106 as well as a central arm portion 1108. The wound spring portion 1106 may contain a lumen (not shown). FIG. 11B is a top view of a spray containment device 100 with a biasing spring 1100 installed at the hinged attachment fitting 204 in one aspect.

As illustrated in FIG. 11B, the hinge pin 266 may be inserted through the lumen of the wound spring portion 1106 of the biasing spring 1100 to retain the biasing spring 1100 in position. The central portion 1108 may be situated upon the surface of the central portion 218 of the top plate 202, and the first and second ends 1102/1104 may be situated over the rear end 302 of the support arm assembly 300. In an aspect, the first and second ends 1102/1104 may be detached from the rear end 302 of the support arm assembly 300 to permit the free rotation of the spray hood assembly 200. By way of non-limiting example, the first and second ends 1102/1104 may be detached from the rear end 302 to permit the rotation of the spray hood assembly 200 into the inverted position as illustrated in FIG. 8 without inducing a restoring force from the biasing spring 1100.

Curtains

Referring again to FIG. 2, the spray hood assembly 200 may include at least one flexible curtain extending from the spray hood 206 to within a predetermined distance from the surface of the field 500 (not shown) in various aspects. In various aspects, the curtains may include a front curtain 208, a rear curtain 210, and a pair of lateral curtains 212/214. In these various aspects, the curtains may contain the spray plume beneath the spray hood 206 while permitting sufficient inward airflow to enable an even distribution of the sprayed compound on the portion of field 500 situated beneath the spray hood 206.

Referring to FIG. 3, FIG. 5, and FIG. 6, the front curtain 208 may be attached to the forward lower edge 241 of the spray hood 206 in an aspect. In another aspect, the front curtain 208 may extend essentially the entire width 242 of the spray hood 206 along the forward lower edge 241. In an additional aspect, the front curtain 208 may extend downward to maintain a front gap 270 of 2 inches or more between the surface of the field 500 and the front curtain 208. In this additional aspect, the front gap 270 may enable the front curtain 208 to flex in a rearward direction to provide clearance over an obstacle 502 on the field 500 (see FIG. 7) without interfering with the distribution of the spray plume onto the field 500. Because the rearward deflection of the front curtain 208 may potentially deflect the lower edge of the front curtain 208 into the internal volume enclosed by the spray hood 206, the front gap 270 reduces the likelihood of deflection of the front curtain 208 into this internal volume.

Referring again to FIG. 3, FIG. 5, and FIG. 6, the rear curtain 210 may be attached to the rear lower edge 243 of the spray hood 206 in an aspect. In another aspect, the rear curtain 210 extends essentially the entire width 242 of the spray hood 206 along the rear lower edge 243. In an additional aspect, the rear curtain 208 may extend downward to maintain a rear gap 272 of 1 inch or less between the surface of the field 500 and the rear curtain 210. In this additional aspect, the rear gap 272 enables the rear curtain 210 to flex in a rearward direction to provide clearance over an obstacle 502 on the field 500 (see FIG. 7). Because the rearward deflection of the rear curtain 210 may deflect the lower edge of the rear curtain 210 away from the internal volume enclosed by the spray hood 206, the rear gap 272 may be less than the front gap 270 without interfering with the distribution of the spray plume onto the field 500.

In various aspects, the front curtain 208 and rear curtain 210 may be produced using any flexible material without limitation. Suitable materials for use in producing the front and rear curtains 208/210 include any flexible plastic material such as polyurethane or polyvinyl chloride (PVC). In one aspect, the front and rear curtains 208/210 may be produced from a polyurethane sheet.

Referring again to FIG. 2, a lower portion of the front and rear sheets 208/210 may be sectioned into two or more strips 274 along the width of the sheets 208/210. In various aspects, each strip 274 may range between about 2 inches and 6 inches in width. In one aspect, each strip 274 may be about 4 inches in width. Each of the two or more strips 274 may extend up to the full height of the front and rear sheets 208/210. In one aspect, the strip 274 may extend up a portion of the full height of the front and rear sheets 208/210 to maintain an intact top portion for attachment to the forward lower edge 241 and rear lower edge 243, respectively.

Referring again to FIG. 2, FIG. 5, and FIG. 10, the spray hood assembly 200 may include a pair of flexible lateral curtains 212/214 covering the lateral openings 238/240 within the lateral faces 232/234 of the spray hood 206. In various aspects, each of the lateral curtains 212/214 may include a front edges 276A/276B attached to the forward face 228 of the spray hood 206 and rear edges 278A/278B attached to the rear face 230 of the spray hood 206. Each of the lateral curtains 212/214 may protrude laterally away from the ends of the spray hood 206 in an open-ended half-cone profile with a relatively small upper opening 280 and larger lower opening 282.

Figure 16:
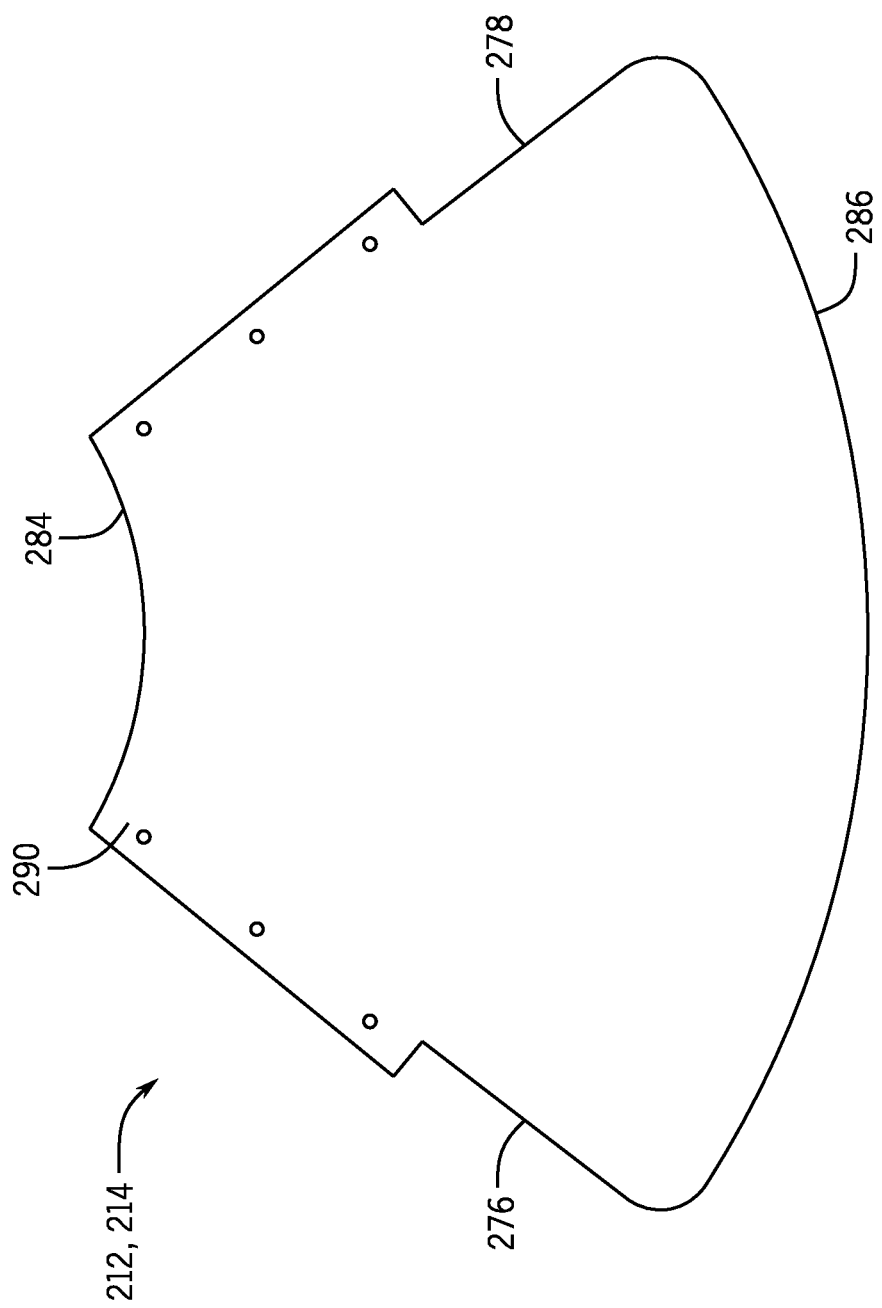

FIG. 16 is a planform view of a lateral curtain 212/214 in one aspect, The lateral curtain 212/214 may include a curved upper edge 284 and a curved lower edge 286 in addition to the front edge 276 and the rear edge 278. The curved lower edge 286 may form a relatively straight profile when installed as illustrated in FIG. 6. Referring again to FIG. 6, the lower edge 286 may maintain a lateral gap 288 of 1 inch or less between the lower edge 286 and the field 500.

Referring again to FIG. 16, the lateral curtains 212/214 may be provided in a symmetrical pattern as illustrated in FIG. 16 in order to enable installation at either end of the spray hood 206 without modification. In some aspects, the front edge 276 and rear edge 278 may be provided with tabs 290 to provide material through which one or more fasteners (not shown) may be inserted to hold the front edge 276 and rear edge 278 in place. In various aspects, the lateral curtains 212/214 may be constructed from any suitable material without limitation including, but not limited to polyurethane.

b. Support Arm

Referring again to FIG. 1, the spray containment device 100 may include a support arm assembly 300 to attach the spray hood assembly 200 to a vehicle including, but not limited to, a tractor. In various aspects, a support arm assembly 300 may provide a compatible attachment fitting for the vehicle at the forward end 304 and a hinged fitting at the rear end 302. In various other aspects, the support arm assembly 300 may enable the spray hood assembly 200 to be maintained at a suitable height over the field 500 during use. In these various other aspects, the height of the forward end 304 and the height of the rear end 302 relative to the field 500 may be different to compensate for differences in height of the attachment point of the vehicle for different models and types of vehicles.

Support Member

The support arm assembly 300 may include one or more support member 320 that may be any suitable support arm without limitation. In one aspect, the support member 320 may be a single elongate structural member including, but not limited to a solid section bar, an I-beam, a tubular bar, and any elongate structural member known in the art. The elongate structural member may have any cross-sectional profile without limitation including, but not limited to: circular, elliptical, square, rectangular, triangular, and any other known cross-sectional profile.

Figure 13A:
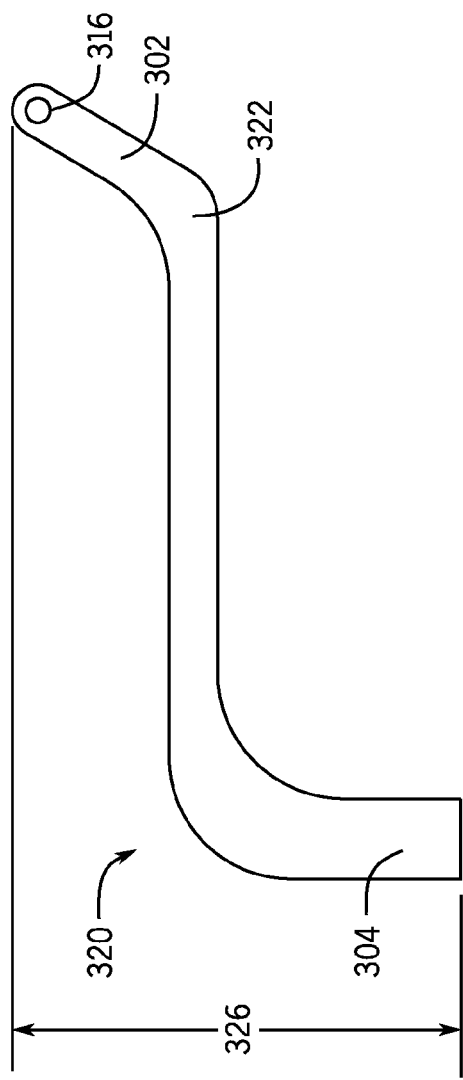
Figure 13B:
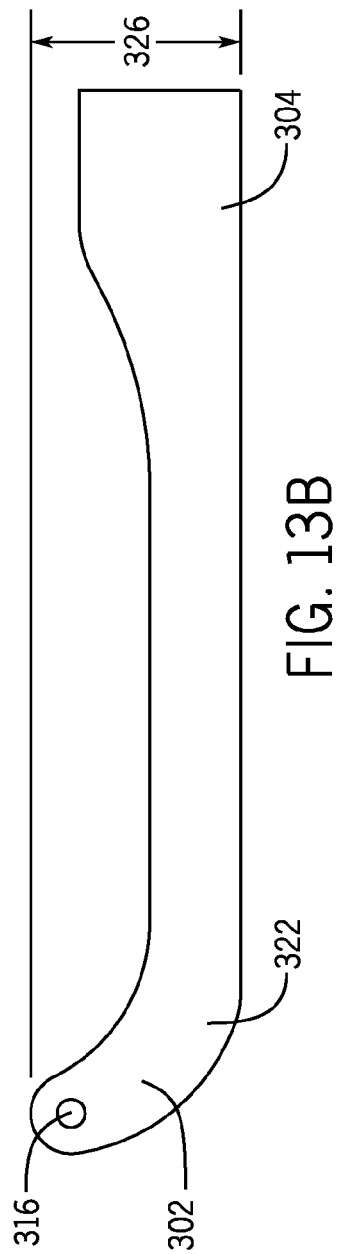

Referring to FIG. 1, the support member 320 may be a pair of support members 320 with a rectangular cross-sectional profile. A side view of a support member 320 in one aspect is illustrated in FIG. 13A. In this aspect, the rear end 302 may contain a hinge pin receptacle 316 to receive a hinge pin 266 as described herein above. The rear end 302 may terminate in any known profile without limitation including, but not limited to a rounded profile as illustrated in FIG. 13A; this profile may be configured to permit the free rotation of the spray hood assembly 200 about the hinged attachment fitting 204. In another aspect, the rear end 302 may terminate in a profile configured to limit the range of rotation motion of the spray hood assembly 200 about the hinged attachment fitting 204 as described previously herein Referring again to FIG. 13A, the support member 320 may include a rear bend 322 to align the rear-most portion of the support member 320 with the angle of the rear tongue 224, as illustrated in FIG. 6, thereby maintaining the spray hood assembly 200 in a vertical operating position as described herein previously. The support arm may further include a front bend 324 to align the front-most portion of the support member 320 at an angle compatible with the attachment fittings of the vehicle in an aspect. The front bend 324 and/or rear bend 322 may be configured to enable a height difference 326 between the forward end 304 and the rear end 302. As illustrated in FIG. 13A, both the front bend 324 and the rear bend 322 may enable the height difference 326. As illustrated in FIG. 13B, a support member with only a rear bend 322, only the rear bend 322 may enable the height difference 326.

The support member 320 may be constructed using any suitable material without limitation including, but limited to a metal, a high-strength polymer or plastic, a wood, and any other suitably strong material. In one aspect, a pair of support members 320A and 320B as illustrated in FIG. 1 may be produced using a steel plate including, but not limited to, a ⅜" hot rolled steel plate.

Spacers

Referring again to FIG. 5, the support members 320A/320B may be maintained at a separation distance by one or more spacers situated between the support members 320A/320B at one or more locations along the length of the support arm assembly 300. As illustrated in FIG. 5, the support arm assembly 300 may include a rear spacer 310 attached at opposed ends to the rear ends 302A/302B of the support members 320A/320B. In addition, the support arm assembly 300 may include a mid-arm spacer 312 attached at opposed ends to the support members 320A/320B at a location between the forward end 304 and rear end 302 of the support arm assembly 300. Further, the support arm assembly 300 may include an attachment plate 314 attached between the support members 320A/320B at the forward end 304 of the support assembly 300 that may further maintain the spacing between the support members 320A/320B.

In various aspects, the spacers 310/312 may be any suitable cross-sectional shape without limitation. In one aspect, the spacers 310 and 312 may be provided in the form of a slab or plate, as illustrated in FIG. 5. In other aspects, not illustrated, the spacers 310 and 312 may be provided in additional forms including, but not limited to: solid bars and/or tubular members. In additional aspects, the spacers 310 and 312 may include bores, cut-outs, and any other openings configured for a variety of uses including, but not limited to: receiving one or more fasteners, supporting peripheral equipment or devices, and any other suitable purpose without limitation.

The spacers 310/312 may be attached to the upper face 220 using any attachment means known in the art without limitation. Non-limiting examples of suitable attachment means include: adhesives, welding, and fasteners such as screws, bolts, pins, rivets, and the like. The support member 320 may be constructed using any suitable material without limitation including, but limited to a metal, a high-strength polymer or plastic, a wood, and any other suitably strong material. In one aspect, a pair of support members 320A/320B as illustrated in FIG. 1 may be produced using a steel plate including, but not limited to, a ⅜" hot rolled steel plate.

In one aspect, the spacers 310/312 may maintain the support members 320A/320B at a relatively constant separation distance, thereby maintaining the support members 320A/320B in an essentially parallel orientation, as illustrated in FIG. 5. In various other aspects, the spacers 310/312 may align the support members 320A/320B in a non-parallel orientation such that the separation distance of the support members 320A/320B at the rear end 302 of the support arm assembly 300 is greater than or less than the separation distance of the support members 320A/320B at the forward end 304.

Attachment Plate

Figure 14B:
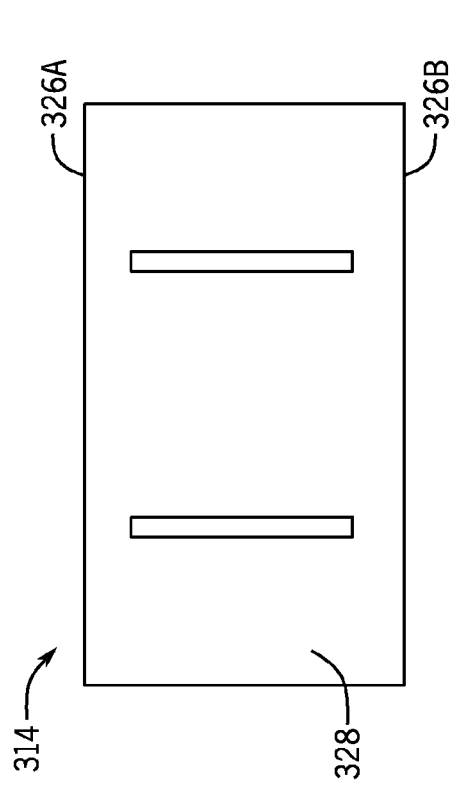
Figure 14C:
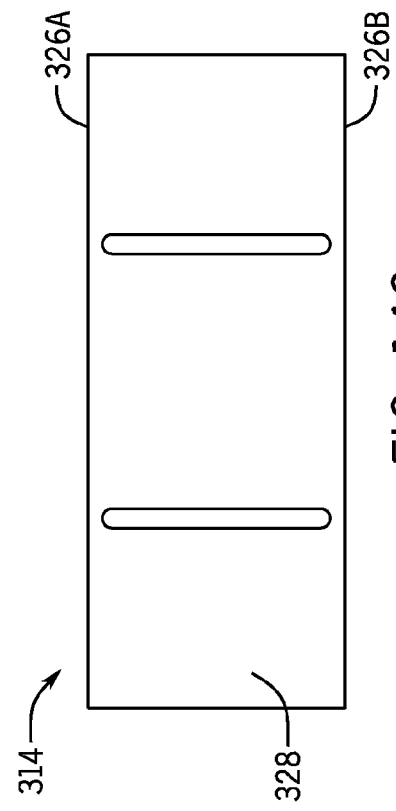
Figure 14A:
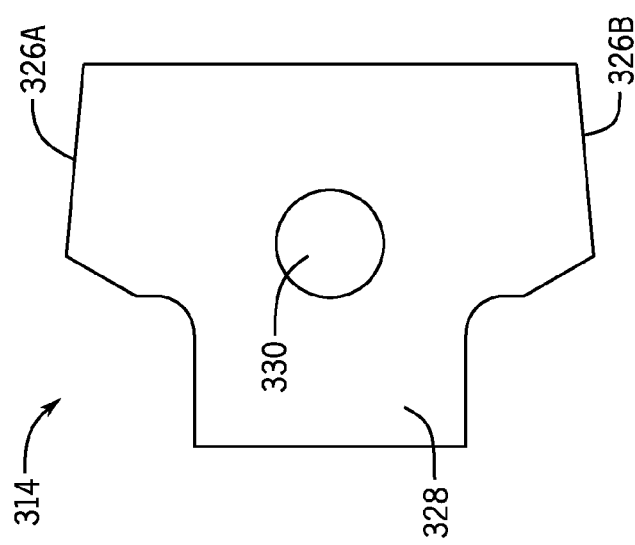

Referring again to FIG. 5, the support arm assembly 300 may include an attachment plate 314 attached to the support member 320 at the forward end 304. As illustrated in FIG. 5, the attachment plate 314 may be attached at opposed edges to the support members 320A/320B. In one aspect, the attachment plate 314 may be configured to mechanically interact with corresponding features of an attachment fitting (not shown) of a vehicle to which the spray containment device 100 is attached. In one aspect, the attachment plate 314 may be provided in the form of a single plate, as illustrated in FIGS. 5 and 6. FIG. 14A is a plan view of the attachment plate 314 illustrated in FIG. 5. As illustrated in FIG. 14A, the attachment plate 314 may include opposed lateral edges 326A/326B to which the forward segments 308 of the support members 320 are attached, as illustrated in FIG. 5. The opposed lateral edges 326A/326B may be parallel, as illustrated in FIG. 14B and FIG. 14C, or the opposed lateral edges 326A/326B may be non-parallel, as illustrated in FIG. 14A.

Referring again to FIG. 5, FIG. 14A, and FIG. 14C, the attachment plate 314 may further include a forward portion 328 configured to interact with various elements of an attachment fitting of the vehicle to enable the attachment of the support arm assembly 300 to the vehicle. The forward portion 328 may be an essentially rectangular projection, as illustrated in FIGS. 14B and 14C in one aspect. In other aspects, the forward portion 328 may include additional features configured to engage one or more elements of the attachment fitting of the vehicle. Non-limiting examples of additional features of the forward portion 328 include: one or more bores 330 as illustrated in FIG. 14A, threaded fittings, raised ridges, raised shafts, trailer hitches, and any other additional feature suitable for enabling the hitching of the support arm assembly 300 to the vehicle.

Referring again to FIG. 5, FIG. 6, and FIG. 17, the attachment plate 314 may be attached to the forward end 304 of the support arm assembly 300 in any orientation without limitation including, but not limited to a horizontal orientation, a vertical orientation, and any other orientation between a horizontal and vertical orientation. In one aspect, the attachment plate 314 may be attached to the forward end 304 of the support arm assembly 300 in a horizontal orientation, as illustrated in FIG. 6. In another aspect, a top view of which is illustrated in FIG. 17, the attachment plate 314 may be attached to the forward end 304 of the support arm assembly 300 in a vertical orientation.

Referring again to FIG. 17, the support arm assembly 300 may further include one or more side plates 332A/332B attached to the lateral edges 326A/326B of the attachment plate 314 in an aspect. The one or more side plates 332A/332B may be configured to interact with additional features of the attachment fitting of the vehicle to which the support arm assembly 300 is attached. FIGS. 15A-15B are side views of side plates 332 in two aspects. Each side plate 332 may include a rear portion 334 configured for attachment to the attachment plate 314 as illustrated in FIG. 17. Each side plate 332 may further include a front portion 336 configured to interact with the features of the vehicle's attachment fitting. In one aspect, the front portion 336 may project forward from the attachment plate 314 as illustrated in FIG. 17. In another aspect, the front portion 336 may include additional features to facilitate the interaction of the side plate 332 with the vehicle's attachment fitting including, but not limited to: bores, threaded fittings, raised ridges, raised shafts, trailer hitches, and any other additional feature suitable for enabling the hitching of the support arm assembly 300 to the vehicle.

II. Spray Containment System

Figure 9:
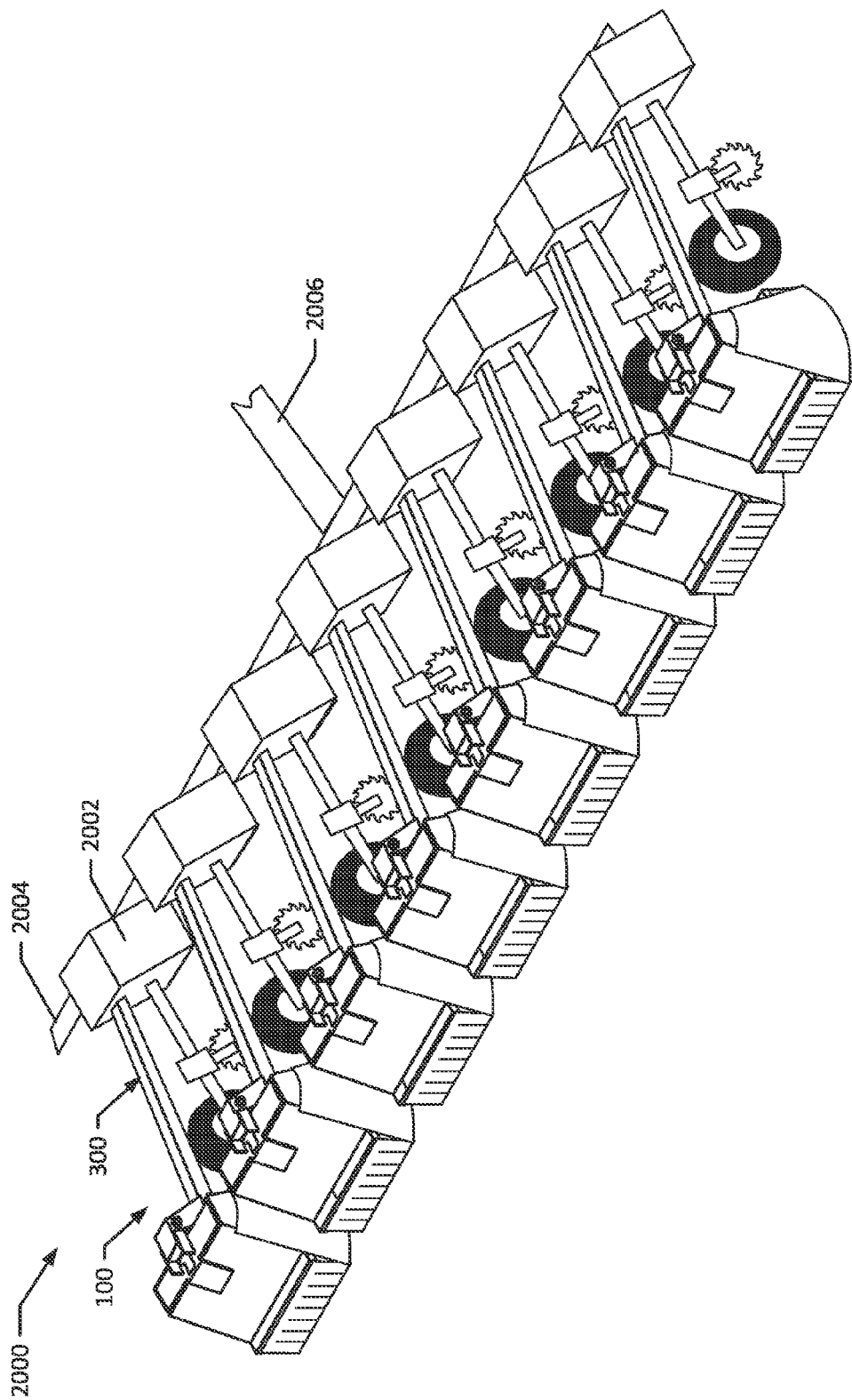

In various aspects, two or more spray containment devices 100 as described herein may be combined to form an agricultural spray containment system 2000. FIG. 9 is an isometric view of an agricultural spray containment system 2000 that includes eight spray containment devices 100 attached to the vehicle (not shown). As discussed previously herein, the support arm assembly 300 of each spray containment device 100 may be independently attached to the vehicle and may operate independently of any of the other spray containment devices 100 of the system 2000.

In one aspect, each spray containment device 100 may be attached to the vehicle. Non-limiting examples of suitable vehicles include farming vehicles such as tractors, trucks, and the like. In various other aspects, the modular design of each spray containment device 100 enables the attachment of each device to a variety of existing agricultural systems and devices including, but not limited to, spray systems, planting systems, soil preparation systems, farming vehicles, and hitching systems. In these various other aspects, the devices 100 of the agricultural spray containment system 2000 may be attached to the vehicle by way of one or more agricultural systems.

By way of non-limiting example, each spray containment device 100 may be attached to a planter unit 2002 as illustrated in FIG. 9. In this example, each planter unit 2002 and attached spray containment device 100 may be ganged together by attachment to a beam 2004. The beam 2004 may be attached to a tractor or other agricultural vehicle using one or more beam attachment arms 2006.

Any number of spray containment devices 100 may be included in the agricultural spray containment system 2000 as needed without limitation. In various aspects, the number of spray containment devices 100 included in the agricultural spray containment system 2000 may range between about 2 and about 32 or more. In various aspects, the devices 100 of the system 2000 may be arranged in any configuration without limitation. In one aspect, the devices 100 may be arranged in a linear configuration as illustrated in FIG. 9. In another aspect, the devices 100 may be arranged in a staggered configuration in which adjacent devices 100 are alternately offset in a forward or rearward direction. In another aspect, the devices 100 may be arranged in an offset configuration in which an adjacent device 100 is offset in a rearward direction relative to a preceding device 100 such that devices 100 are aligned along a diagonal line extending laterally and rearward relative to a lead device 100 in the system 2000.

In various aspects, each device 100 in the system 2000 is configured to spray the width of one or more planted rows of a crop, with a slight degree of overlap with one or more adjacent planted rows. In one aspect, the agricultural spray containment system 2000 may be used to apply a sprayed agricultural product at the same time as another agricultural operation, such as the planting of a crop using a plurality of planting units 2002 as illustrated in FIG. 9. In another aspect, the agricultural spray containment system 2000 may be used to apply a sprayed agricultural product separately from other agricultural operations.

The foregoing merely illustrates the principles of the invention. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the invention and are thus within the spirit and scope of the present invention. From the above description and drawings, it will be understood by those of ordinary skill in the art that the particular embodiments shown and described are for purposes of illustrations only and are not intended to limit the scope of the present invention. References to details of particular embodiments are not intended to limit the scope of the invention.

What is claimed is:

1. An agricultural spray containment device for attachment to a vehicle, the device comprising:
   a spray hood assembly comprising a spray hood and a top plate, the top plate comprising a hinged attachment fitting and a spray head attachment fitting; and
   a support arm assembly comprising a forward end operatively coupled to the vehicle and a rear end operatively coupled to the top plate at the hinged attachment fitting;
   wherein:
   the top plate provides a structural attachment point for the spray hood attached to a lower surface of the top plate; and
   the hinged attachment fitting permits upward rotation of the top plate and the attached spray hood to provide clearance over an obstacle;
   wherein the spray hood has a trapezoidal cross-section defined by an upper face, a forward face extending down and forward from the upper face, and a rear face extending down and rearward from the upper face;
   the spray hood further including first and second lateral faces having first and second lateral openings therein, respectively;
   the spray hood further including a forward lower edge extending forward and outward from a lower end of the forward face and a rearward lower edge extending rearward and outward from a lower end of the rear face;
   wherein the forward face and the rear face both extend along a flat plane from the first lateral face to the second lateral face;
   wherein the hinged attachment fitting further comprises a biasing spring to provide a restoring torque and to return the top plate to a horizontal position after an upward rotation;
   wherein the spray hood comprises an open-ended shell covering a region of a field, the region corresponding to an area wetted by a spray head directed into the spray hood via the spray head attachment fitting; and
   wherein the spray hood assembly further comprises:
      a front curtain comprising a first flexible rectangular sheet with a front curtain edge attached to a lower front edge of the front face and hanging downward;
      a rear curtain comprising a second flexible rectangular sheet with an rear curtain edge attached to a lower rear edge of the rear face and hanging downward; and
      a pair of lateral curtains, each lateral curtain comprising a flexible trapezoidal sheet including a front lateral curtain edge affixed to the front face adjacent to the forward lower edge and a rear lateral curtain edge affixed to the rear face adjacent to the rear lower edge, wherein each attached lateral curtain forms a conical profile curving laterally outward from one of the first and second lateral faces.

2. The device of claim 1, wherein:
   the front curtain further comprises a lower front curtain edge opposite to the front curtain edge and hanging to a distance of at least 2 inches above the field;
   the rear curtain further comprises a lower rear curtain edge opposite to the rear curtain edge and hanging to a distance of at least 1 inch above the field; and each lateral curtain further comprises a lower lateral curtain edge forming a lower edge of the conical profile at a distance of at least 1 inch above the field.

3. The device of claim 2, wherein the spray hood assembly is situated behind a planter unit.

4. The device of claim 3, wherein the top plate further comprises:
   a central portion comprising the lower surface covering at least a portion of the top face of the spray hood, wherein:
   the hinged attachment fitting is attached to an upper surface of the central portion opposite to the lower surface; and
   the central portion defines the spray head attachment fitting extending through the upper surface and the lower surface; and
   a forward tongue projecting forward and downward from a forward edge of the central portion, wherein a forward contact surface of the forward tongue contacts at least a portion of the forward face of the spray hood.

5. The device of claim 4, further comprising a mechanical interference between the forward tongue and at least a portion of the support arm assembly, the mechanical interference limiting rotation of the top plate and spray hood.

6. The device of claim 5, wherein the top plate further comprises a rear tongue projecting rearward and downward from a rear edge of the central portion, wherein a rear contact surface of the rear tongue contacts at least a portion of the rear face of the spray hood.

7. A planter comprising the agricultural spray containment device according to claim 1.

8. An agricultural spray containment system for attachment to a vehicle, the system comprising:
   at least two spray containment devices, each spray containment device including:
   a spray hood assembly comprising a spray hood and a top plate, the top plate comprising a hinged attachment fitting and a spray head attachment fitting; and
   a support arm comprising a forward end operatively coupled to the vehicle and a rear end operatively coupled to the top plate at the hinged attachment fitting;
   wherein:
   the top plate provides a structural attachment point for the spray hood attached to a lower surface of the top plate; and
   the hinged attachment fitting permits upward rotation of the top plate and attached spray hood to provide clearance over an obstacle;
   wherein each spray hood has a trapezoidal cross-section defined by an upper face, a forward face extending down and forward from the upper face, and a rear face extending down and rearward from the upper face;
   each spray hood further including first and second lateral faces having first and second lateral openings therein, respectively;
   each spray hood further including a forward lower edge extending forward and outward from a lower end of the forward face and a rearward lower edge extending rearward and outward from a lower end of the rear face;

wherein the forward face and the rear face both extend along a flat plane from the first lateral face to the second lateral face;

wherein the hinged attachment fitting of each of the at least two spray containment devices further comprises a biasing spring to provide a restoring torque and return the corresponding top plate to a horizontal position after an upward rotation;

wherein the spray hood of each of the at least two spray containment devices comprises an open-ended shell covering a region of a field, the region corresponding to an area wetted by a spray head; and wherein the spray hood assembly further comprises:
- a front curtain comprising a first flexible rectangular sheet with a front curtain edge attached to a lower front edge of the front face and hanging downward;
- a rear curtain comprising a second flexible rectangular sheet with an rear curtain edge attached to a lower rear edge of the rear face and hanging downward; and
- a pair of lateral curtains, each lateral curtain comprising a flexible trapezoidal sheet including a front lateral curtain edge affixed to the front face adjacent to the forward lower edge and a rear lateral curtain edge affixed to the rear face adjacent to the rear lower edge, wherein each attached lateral curtain forms a conical profile curving laterally outward from one of the first and second lateral faces.

9. The system of claim 8, wherein each of the at least two spray containment devices rotates upward independently of any of the other spray containment devices.

10. The system of claim 9, wherein the spray hood assembly of each of the at least two spray containment devices is situated behind one planter unit attached to the vehicle.

11. The system of claim 10, wherein the region of the field covered by the spray hood of each of the at least two spray containment devices comprises at least one row planted by the one planter unit situated forward of each spray containment device.

12. The system of claim 11, wherein each of the one planter units is independently selected from: a single row planter unit or a twin row planter unit.

13. The system of claim 12, wherein the hinged attachment fitting of each of the at least two spray containment devices permits upward rotation of the top plate sufficient to invert the spray hood to facilitate maintenance of the spray containment device.

14. A planter comprising the agricultural spray containment system according to claim 8.

15. A planter comprising an agricultural spray containment device, comprising: a planter unit;

a spray hood assembly comprising a spray hood and a top plate, the top plate comprising a hinged attachment fitting and a spray head attachment fitting;

a support arm assembly comprising a forward end operatively coupled to the planter unit and a rear end operatively coupled to the top plate at the hinged attachment fitting;

the top plate provides a structural attachment point for the spray hood attached to a lower surface of the top plate; and the hinged attachment fitting permits upward rotation of the top plate and the attached spray hood to provide clearance over an obstacle, the hinged attachment fitting comprising a biasing member to provide a restoring torque and to return the top plate to a horizontal position after an upward rotation;

wherein the spray hood has a trapezoidal cross-section defined by an upper face, a forward face extending down and forward from the upper face, and a rear face extending down and rearward from the upper face;

the spray hood further including first and second lateral faces having first and second lateral openings therein, respectively;

the spray hood further including a forward lower edge extending forward and outward from a lower end of the forward face and a rearward lower edge extending rearward and outward from a lower end of the rear face;

wherein the forward face and the rear face both extend along a flat plane from the first lateral face to the second lateral face;

wherein the spray hood comprises an open-ended shell covering a region of a field, the region corresponding to an area wetted by a spray head directed into the spray hood via the spray head attachment fitting; and wherein the spray hood assembly further comprises:
- a front curtain comprising a first flexible rectangular sheet with a front curtain edge attached to a lower front edge of the front face and hanging downward;
- a rear curtain comprising a second flexible rectangular sheet with an rear curtain edge attached to a lower rear edge of the rear face and hanging downward; and
- a pair of lateral curtains, each lateral curtain comprising a flexible trapezoidal sheet including a front lateral curtain edge affixed to the front face adjacent to the forward lower edge and a rear lateral curtain edge affixed to the rear face adjacent to the rear lower edge, wherein each attached lateral curtain forms a conical profile curving laterally outward from one of the first and second lateral faces.

* * * * *